(12) United States Patent
Roy

(10) Patent No.: US 9,820,369 B2
(45) Date of Patent: Nov. 14, 2017

(54) METHOD AND APPARATUS FOR PROVIDING HIGH CONTROL AUTHORITY ATMOSPHERIC PLASMA

(71) Applicant: University of Florida Research Foundation, Incorporated, Gainesville, FL (US)

(72) Inventor: Subrata Roy, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 14/770,347

(22) PCT Filed: Feb. 25, 2014

(86) PCT No.: PCT/US2014/018444
§ 371 (c)(1),
(2) Date: Aug. 25, 2015

(87) PCT Pub. No.: WO2014/131055
PCT Pub. Date: Aug. 28, 2014

(65) Prior Publication Data
US 2016/0007436 A1    Jan. 7, 2016

Related U.S. Application Data

(60) Provisional application No. 61/769,029, filed on Feb. 25, 2013.

(51) Int. Cl.
*H05H 1/24*  (2006.01)
*B64C 23/00* (2006.01)
*F15D 1/00*  (2006.01)

(52) U.S. Cl.
CPC .............. *H05H 1/24* (2013.01); *B64C 23/005* (2013.01); *F15D 1/0075* (2013.01);
(Continued)

(58) Field of Classification Search
CPC ................... H05H 1/24; H05H 1/2406; H05H 2001/2412; B64C 23/00; B64C 23/005; F15D 1/0075
(Continued)

(56) References Cited

U.S. PATENT DOCUMENTS 3,095,163 A    6/1963  Hill
4,169,351 A   10/1979  Barber
(Continued)

FOREIGN PATENT DOCUMENTS

EP    0903487    3/1999
EP    1445465    8/2004
(Continued)

OTHER PUBLICATIONS

Auweter-Kurtz, M., et al., "Heterogeneous Domain Decomposition Methods for Compressible Magneto-plasma Flows," *Hyperbolic Problems: Theory, Numerics, Applications*, vol. 1, 2001, Abstract.
(Continued)

*Primary Examiner* — Thai Pham
(74) *Attorney, Agent, or Firm* — Saliwanchik, Lloyd & Eisenschenk

(57) ABSTRACT

Embodiments of the invention relate to a method and apparatus for providing high thrust density plasma, and/or high control authority plasma. In specific embodiments, such high thrust density, and/or high control authority, plasma can be at or near atmospheric pressure. Embodiments pertain to a method and apparatus that use electron confinement via one or more magnetic fields, and/or one or more electric fields, in a manner to improve the ionization due to surface plasma actuators. Specific embodiments can improve ionization by several orders of magnitude. This
(Continued)

improved ionization can result in a high electric field inside the sheath for the same applied voltage and can result in very high thrust.

30 Claims, 18 Drawing Sheets

(52) U.S. Cl.
CPC ....... *H05H 1/2406* (2013.01); *B64C 2230/12* (2013.01); *H05H 2001/2412* (2013.01); *Y02T 50/166* (2013.01)

(58) Field of Classification Search
USPC ............. 315/111.01, 111.21, 111.41, 111.91; 417/48, 53
See application file for complete search history.

(56) References Cited

U.S. PATENT DOCUMENTS

| | | | |
|---|---|---|---|
| 4,838,021 | A | 6/1989 | Beattie |
| 5,020,411 | A | 6/1991 | Rowan |
| 5,052,638 | A | 10/1991 | Minovitch |
| 5,239,820 | A | 8/1993 | Leifer et al. |
| 5,300,861 | A | 4/1994 | Helgesen et al. |
| 5,592,055 | A | 1/1997 | Capacci et al. |
| 5,632,876 | A | 5/1997 | Zanzucchi et al. |
| 5,893,968 | A | 4/1999 | Kato |
| 5,938,854 | A | 8/1999 | Roth |
| 5,947,421 | A | 9/1999 | Beattie et al. |
| 5,985,118 | A | 11/1999 | Makino et al. |
| 6,121,569 | A | 9/2000 | Miley et al. |
| 6,131,385 | A | 10/2000 | Lewis, Jr. et al. |
| 6,135,394 | A | 10/2000 | Kamel et al. |
| 6,293,499 | B1 | 9/2001 | MacGillivray et al. |
| 6,334,302 | B1 | 1/2002 | Chang-Diaz |
| 6,373,023 | B1 | 4/2002 | Hoskins et al. |
| 6,530,212 | B1 | 3/2003 | Phipps et al. |
| 6,533,554 | B1 | 3/2003 | Varga et al. |
| 6,570,333 | B1 | 5/2003 | Miller et al. |
| 6,769,241 | B2 | 8/2004 | Spanjers et al. |
| 6,822,180 | B2 | 11/2004 | Fujii et al. |
| 6,895,800 | B2 | 5/2005 | Tomura et al. |
| 6,949,176 | B2 | 9/2005 | Vacca et al. |
| 7,182,846 | B2 | 2/2007 | Mizutani et al. |
| 7,183,515 | B2 | 2/2007 | Miller et al. |
| 7,269,940 | B2 | 9/2007 | Wiseman |
| 7,380,756 | B1* | 6/2008 | Enloe .................. B64C 23/005 244/130 |
| 7,464,902 | B2 | 12/2008 | Leyre et al. |
| 7,506,497 | B2 | 3/2009 | Roy |
| 7,509,795 | B2 | 3/2009 | Allen |
| 7,581,380 | B2 | 9/2009 | Wahl |
| 7,637,455 | B2 | 12/2009 | Silkey et al. |
| 7,857,254 | B2 | 12/2010 | Parks |
| 7,870,719 | B2 | 1/2011 | Lee et al. |
| 7,887,301 | B2 | 2/2011 | Zoulkarneev et al. |
| 7,988,101 | B2 | 8/2011 | Osborne et al. |
| 2003/0213874 | A1 | 11/2003 | Ockels et al. |
| 2005/0009101 | A1 | 1/2005 | Blackburn |
| 2007/0044450 | A1 | 3/2007 | Kuninaka |
| 2007/0089795 | A1* | 4/2007 | Jacob .................. B64C 23/005 137/827 |
| 2007/0126292 | A1 | 6/2007 | Lugg |
| 2008/0023589 | A1 | 1/2008 | Miles et al. |
| 2008/0118370 | A1 | 5/2008 | Zoulkarneev et al. |
| 2008/0131293 | A1 | 6/2008 | Hanaoka et al. |
| 2008/0134663 | A1 | 6/2008 | Totani et al. |
| 2009/0153015 | A1 | 6/2009 | King |
| 2010/0102174 | A1 | 4/2010 | Roy |
| 2010/0127624 | A1 | 5/2010 | Roy |
| 2010/0150738 | A1 | 6/2010 | Gimsa et al. |
| 2012/0304618 | A1 | 12/2012 | Roy |
| 2013/0038199 | A1* | 2/2013 | Roy .................. H05H 1/24 313/231.31 |

FOREIGN PATENT DOCUMENTS

| | | |
|---|---|---|
| EP | 1 995 173 | 11/2008 |
| JP | 1310179 | 12/1989 |
| JP | 2006-187770 | 7/2006 |
| KR | 10-2005-0097313 | 5/2006 |
| WO | WO-01/18948 | 3/2001 |

OTHER PUBLICATIONS

Giacomazzi, E., et al., "Miniaturized Propulsion," Propulsion 2000—Phase II Final Report for European Space Agency, Feb. 2003.

Grubisic, A.N., et al., "On-a-chip microdischarge thruster arrays inspired by photonic device technology for plasma television," ESA, Oct. 2009, pp. 1-93.

Hrbud, I., et al., "Review of RF Plasma Thruster Development," 30th International Electric Propulsion Conference, Sep. 2007, Florence, Italy.

Hunyadi, G., et al., "The University Nanosat Program: An Adaptable, Responsive and Realistic Capability Demonstration Vehicle," *Proceedings of the 2004 IEEE Aerospace Conference*, Mar. 2004, pp. 1-9, vol. 5.

Ketsdever, A.D., et al., "Performance Testing of a Microfabricated Propulsion System for Nanosatellite Applications," Journal of Micromechanics and Microengineering, Dec. 2005, pp. 2254-2263, vol. 15, No. 12.

Konstantinov, M.S., et al., "The Use of a Solar Electrojet Propulsion System for Jupiter Satellite Injection," *Cosmic Research*, Mar. 2002, pp. 186-193, vol. 40, No. 2.

Lee, R.H., etal., "Free Molecule Micro-Resistojet: Nanosatellite Propulsion," AIAA Paper No. 2005-4073, $41^{st}$ AIAA/ASME/SAE/ASEE Joint Propulsion Conference & Exhibit, Jul. 2005, Tucson, AZ.

Lemoff, A.V., et al., "An AC magnetohydrodynamic micropump," *Sensors and Actuators B*, 2000, vol. 63, pp. 178-185.

Raju, R., et al., "Modeling Single Component Fluid Transport Through Micro Channels and Free Molecule Micro-Resistojet," AIAA Paper No. 2004-1342, $42^{nd}$ Aerospace Sciences Meeting and Exhibit, Jan. 2004, Reno, NV.

Richter, A., et al., "An Electrohydrodynamic Micropump," IEEE, 1990, pp. 1-6.

Roth, J.R., "Aerodynamic Flow Acceleration Using Paraelectric and Peristaltic Electro-hydrodynamic Effects of a One Atmosphere Uniform Glow Discharge Plasma", *Physics of Plasmas*, 2003, pp. 2117-2126, vol. 10, No. 5.

Roy, S., "Flow Actuation Using Radio Frequency in Partially-ionized Collisional Plasmas", Applied Physics Letters, 2005, pp. 101502-1 to 101502-3, vol. 86, No. 10.

Roy, S., et al., "Force Interaction of High Pressure Glow Discharge with Fluid Flow for Active Separation Control", *Physics of Plasmas*, 2006, pp. 023503-1 to 023503-11, vol. 13, No. 2.

Roy, S., et al., "Modeling Gas Flow Through Microchannels and Nanopores," *Journal of Applied Physics*, Apr. 2003, pp. 4870-4879, vol. 93, No. 8.

Roy, S., et. al., "Effective Discharge Dynamics for Plasma Actuators", AIAA 44th Aerospace Sciences Meeting and Exhibit, Jan. 9-12, 2006, AIAA-2006-0374 Paper, pp. 1-12, Reno, NV.

Singh, K.P., et al., "Simulation of an Asymmetric single Dielectric Barrier Plasma Actuator", *Journal of Applied Physics*, 2005, 083303-1 to 083307-7, vol. 98, No. 8.

Veselovsky, I.S., "Non-Local Dissipative Structures in the Solar Corona: Flaring Loops," *Proceedings of SOHO 11 Symposium, "From Solar Min to Max; Half a Solar Cycle with SOHO"*, Mar. 2002, pp. 461-464, Davos, Switzerland.

Visbal, M.R, et al., "Control of Transitional and Turbulent Flows Using Plasma-Based Actuators", AIAA Fluid Dynamics and Flow Control Conference, Jun. 2006, AIAA-2006-3230 Paper, pp. 1-22, San Francisco, CA.

(56) References Cited

OTHER PUBLICATIONS

Zakrzwski, C., et al., "Pulsed Plasma Thrust (PPT) Summary," NASA, 2005, pp. 1-2.

* cited by examiner

METHOD AND APPARATUS FOR PROVIDING HIGH CONTROL AUTHORITY ATMOSPHERIC PLASMA

CROSS-REFERENCE TO RELATED APPLICATION

The present application is a National Stage Application of International Application Number PCT/US2014/018444, filed Feb. 25, 2014, which claims the benefit of U.S. Provisional Application Ser. No. 61/769,029, filed Feb. 25, 2013, both of which are hereby incorporated by reference herein in their entirety, including any figures, tables, or drawings.

BACKGROUND OF INVENTION

The thrust generation capability of state-of-the-art dielectric barrier discharge actuators, or surface plasma actuators, is typically significantly limited due to weak ionization. The weak ionization causes a low plasma force. Dielectric barrier discharge actuators or surface plasma actuators can also suffer from viscous drag loss due to large wall shear. The shear force, or drag, on wall jets created by dielectric barrier discharge actuators, or surface plasma actuators, slows down the wall jet and reduces the kinetic energy of the wall jet.

BRIEF SUMMARY

Embodiments of the invention relate to a method and apparatus for providing high thrust density plasma, and/or high control authority plasma. In specific embodiments, such high thrust density, and/or high control authority, plasma can be at or near atmospheric pressure. Specific embodiments pertain to a method and apparatus that use electron confinement via one or more magnetic fields, and/or one or more electric fields, in a manner to improve the ionization due to surface plasma actuators. Specific embodiments can improve ionization by several orders of magnitude. This improved ionization can result in a high electric field inside the sheath for the same applied voltage and can result in very high thrust.

The improvement in ionization can lead to more charge separation within the charge separated region. In other words, the net space charge, which is m-n, where n is the number/density of electrons and negative ions and m is the number/density of positive ions, can be increased. As the force (F=q×E) is proportional to the amount of charge, improving ionization can increase the force, hence creating higher thrust.

Embodiments can reduce drag, or shear force, experienced by the wall jet of a surface plasma actuator. Fluid, such as air, can be entrained to control shear related drag by changing the near wall flow field over the actuator surface. Embodiments can result in thrust improvement and drag control.

Embodiments can also provide a method and apparatus for dielectric barrier discharge actuation, and/or surface plasma actuation, where at least one electrode of the electrode pair is separated from the surface. Embodiments having an electrode separated from the surface can allow for a thicker boundary layer, less induced wall shear, deeper penetration into the bulk flow region (allowing, e.g., higher control authority), both passive and active boundary layer control effect, and/or the use of a laser and/or electron beam as the electrode separated from the surface, than traditional surface plasma actuators.

DETAILED DISCLOSURE

Embodiments of the invention relate to a method and apparatus for providing high thrust density plasma. In specific embodiments, such high thrust density plasma can be at or near atmospheric pressure. Specific embodiments can operate at 80%, 85%, 90%, 95%, 96%, 97%, 98%, 99%, 101%, 102%, 103%, 104%, 105%, 110% and/or 120% of atmospheric pressure. Specific embodiments pertain to a method and apparatus that use electron confinement via one or more magnetic fields in a manner to improve the ionization due to surface plasma actuators. Specific embodiments can improve ionization by several orders of magnitude. This improved ionization can result in a high electric field inside the sheath for the same applied voltage and can result in very high thrust.

The measured thrust of a plasma actuator is the plasma induced body force minus the viscous drag. The plasma force can increase by increasing the ionization. The improvement in ionization can lead to more charge separation within the space charge separated region. In this way, the net space charge, which is m-n, where n is the number/density of electrons and negative ions and m is the number/density of positive ions, can be increased. As the force density (F=q×E, where E is the electric field) is proportional to the amount of separated charge (q=e(m−n), improving ionization can increase q, which in effect increases the force, hence creating higher thrust.

Another component of the thrust is the viscous drag loss. Embodiments can reduce drag, or shear force, experienced by the wall jet of a surface plasma actuator. Fluid, such as air, can be entrained to control shear related drag by changing the near wall flow field over the actuator surface. Embodiments can result in thrust improvement and drag control.

Figure 1A:
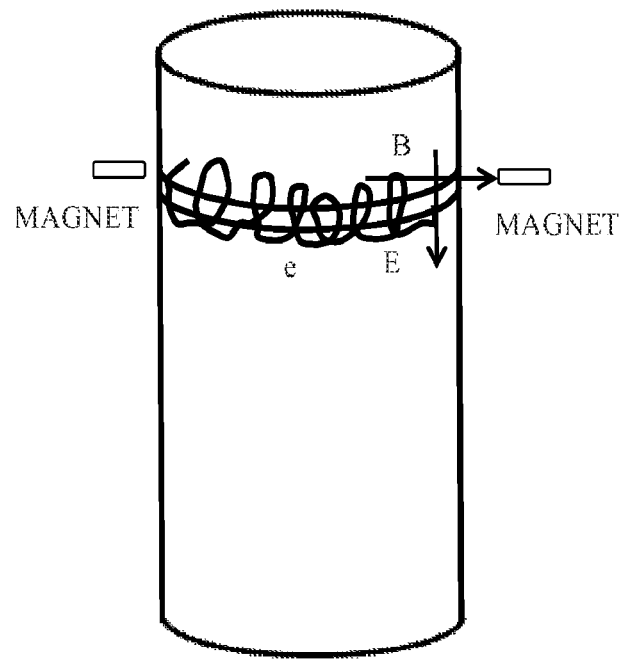
FIGS. 1A and 1B show how electrons can gyrate, following an approximate azimuthal direction path along (E+v×B) line, where E is an electron field vector, v is a velocity vector, and B is a magnetic field vector.
Figure 1B:
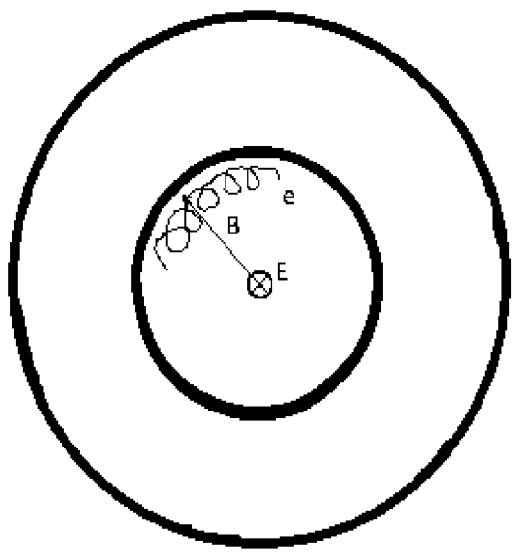

FIG. 1A shows a perspective view of a hollow cylinder that can incorporate one or more surface plasma actuators, or dielectric barrier discharge actuators, 2 at or near the inner surface of the hollow cylinder. The wall 4 of the cylinder can incorporate a dielectric material to separate electrode of the actuators' electrode pairs. FIG. 1B shows a cross-section of the hollow cylinder of FIG. 1A. In specific embodiments, one electrode of the electrode pair of an actuator can be located within the wall, on the outer surface of the wall, or other location, and the other electrode of the pair can be located on, or near, the inner surface of the wall, or other position, so as to allow a surface plasma to be generated in accordance with the invention. In a specific embodiment, the electrodes of the pair are offset from each other in a longitudinal direction with respect to the cylinder, but at the same angular rotation angle with respect to the angular rotation about the longitudinal axis of the cylinder. Specific embodiments can utilize electrode pairs that have an angular rotation of 0°, 90°, 45°, 30°, and/or an angle in a range between any two of these angles. Activation of the actuator creates a thrust in the direction of the E field, which is down in FIG. 1A and into the page in FIG. 1B. Note, the E-field created is typically near the surface, and is shown in the center of the cylinder in FIG. 1B for convenience. Specific embodiments, referring to FIGS. 1A and 1B can incorporate one or more electrodes that are separated from the surface of the cylinder. In such an embodiment, an electric field can be created near the center of the cylinder.

Specific embodiments can have the electrode pairs positioned parallel to the longitudinal axis of the cylinder. In such embodiments, the electric field is perpendicular to the longitudinal axis, and a different mechanism creates a flow in the direction of the longitudinal axis. The electric field shown in FIG. 1B results when the electrodes have a 0° angular rotation angle. For angular rotation angles greater than 0° and less than 90°, for example 45°, the electric field can have a spiral pattern.

A magnetic field can be created near the surface of the inner wall of the cylinder. Such magnetic fields should have a component normal to the surface of the inner wall and in specific embodiments can be normal to the surface of the inner wall. FIG. 1A shows the position of a couple of magnets that produce a magnetic field that is normal to the surface of the inner wall, as shown by the arrow in FIG. 1A. The magnetic field can be provided by permanent magnets and/or electromagnets. Embodiments can have magnets positioned such that all the magnets have N, or S, facing toward the surface such that the B-field is N coming out or S coming out of the surface. Other embodiments, such as a channel, can have all N's on one side and all S's on the opposite side and all N's, or all S's, on the top and all S's, or all N's, on the bottom, respectively; have alternating N's and S's for adjacent magnets and opposite S's and N's on the opposite position of the channel; or other permutations. The magnetic field can be time dependent, such as with the use of a moving permanent magnet or a stationary or moving electromagnet. In an embodiment with adjacent magnets alternating N and S in a circumferential direction, for example in a cylinder channel, a conductor can be positioned on the longitudinal axis to provide an electric field that is perpendicular to a B-field created between adjacent N and S magnets, such that positive ions are pushed toward the surface and the B-field.

In the embodiment, shown in FIG. 1A, the electric field E caused by the plasma actuator is shown as pointing down and the magnetic field B is shown pointing toward the surface of the inner wall. The electric field will likely have some component in the direction normal to the inner surface and, accordingly, will have a direction that is not parallel to the longitudinal axis but at a small angle with respect to the longitudinal axis. Likewise, if desired, the magnetic field can also have a direction that is not normal to the inner surface. The electric field tends to drive the electrons along a direction parallel to the electric field (opposite direction) and the moving electrons experience a force due to the magnetic field, where as the magnetic field has a component perpendicular to the electric field, the combination of these two forces creates a gyrating path in a generally azimuthal direction (i.e., a direction that follows a curve parallel to the inside surface of the hollow cylinder), such that the electron is "trapped" near the surface of the inner surface. This trapping is due to the electron being pushed parallel to the tangent of the inner surface of the cylinder with a component of the force having an angular rotation of 0°, where the curve of the inner surface resulting in the electron being closer to the surface as the electron travels circumferentially.

In an embodiment where the pair of electrodes have an angular rotation angle greater than 45°, such as 90°, the electric field has a component perpendicular to the longitudinal axis and this component has a component, and is typically largely, in a direction parallel to the tangent of the inner surface of the cylinder. In this way, the component of the electric field that is perpendicular to the longitudinal axis and parallel to the tangent pushes the electrons in the direction parallel to such tangent and pushes the positive ions in the opposite direction. The electrons and positive ions pushed parallel to the tangent are then pushed in a direction parallel to the longitudinal axis by the component of the magnetic field that is normal to the surface of the cylinder. This pushing of the positive ions in a direction parallel with the longitudinal axis increases the thrust force in the direction parallel to the longitudinal axis. This embodiment can also be implemented on a device having a flat surface, such as a tube having a cross-sectional shape with straight edges, such as a rectangular cross-section. In the embodiment having a curved surface such as the cylinder shown in FIGS. 1A and 1B, the electrons pushed by the electric field can also experience a "trapping" effect.

This trapping of the electrons increases the net space charge, which is the difference between the number/density of electrons and the number/density of positive ions. The magnitudes of the electric and magnetic fields are such that the ions are not typically trapped, as the larmor radius of the ions is too large, where the larmor radius is the radius of the motion induced by the movement of the positive ion in the magnetic field. Accordingly, the magnitude of the magnetic field, the actuators (e.g., dimensions and driving voltages), and the dimensions (e.g., inner radius) of the cylinder are selected such that the electrons are trapped, e.g., the larmor radius of the electrons allows such trapping. Without trapping, the electron just leaves the ionization area via drift, such that ionization is lower than about $1/10^5$. As the electrons are trapped, the magnitude of ionization increases such that ionization is improved. In an embodiment, the inside of the cylinder can have a mixture of gases that includes air and/or one or more other gases that can be ionized. In a specific embodiment the inside of the cylinder is filled with air. The electric field is shown in FIG. 1B as going into the page in the center of the cylinder; however, the electric field is into the page, but near the surface of the inner wall of the cylinder. Likewise, the magnetic field vector arrow starts at the center of the cylinder and points toward the inner wall, while the magnetic field exists near the surface of the inner wall to trap the electrons and need not extend to the center of the cylinder if ionization is not occurring near the center of the cylinder.

Although FIGS. 1A and 1B show a cylinder, embodiments can incorporate a B-field normal to the surface of the surface plasma actuator on a variety of curved surface, where the curve has a large enough radius of curvature and an axis of curvature (e.g., if a chord having a length the same as the radius of curvature is rotated about the axis of curvature by an endpoint to such that the chord's other endpoint traced the curve) to create the electron trapping effect, given the size of the electric field (i.e., voltage applied to actuator electrodes), the magnitude of the magnetic field, the shape and dimensions of the electrodes (e.g., width and height), the spacing between the electrodes in a direction normal to the surface, the spacing between the electrodes in a direction parallel (or generally parallel) with the surface of the surface plasma actuator, the properties of the electrode materials and materials separating the electrodes and in the vicinity of the electrodes.

The magnetic field can be created in a variety of manners, including electromagnets, permanent magnets, Hailbach cylinder, as well as other ways. In an embodiment, numerous small permanent magnets can be positioned around the exterior of the cylinder, partially or wholly within the cylinder wall, or otherwise positioned to create a magnetic field near the surface of inner wall having a component normal to the inner wall surface at the position of ionization. In an embodiment, such permanent magnets can be, for example, 3-5 mm long and 3-4 cm wide. The magnetic field can be constant or time dependent. The electric field arises from the actuator and can be constant or time dependent, such as pulsed or ac.

FIGS. 1A and 1B show how electrons can gyrate, following an approximate azimuthal direction path along (E+v×B) line, where E is an electron field vector, v is a velocity vector, and B is a magnetic field vector. Such a gyration can promote increased ionization (e.g., impact) as the electrons stay near the surface of the wall where ionization occurs. Thus, the majority force, or the force creating axial thrust, can increase significantly.

Figure 2A:
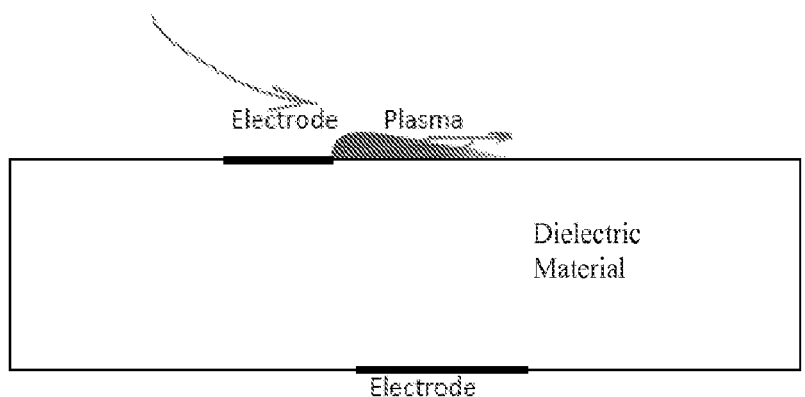
FIGS. 2A-2E show how surface flow manipulation can be accomplished using a flow entrainment passage.

Operation of the surface plasma actuators can result in a wall jet downstream of the exposed electrode, as shown in FIG. 2A. Embodiments of the invention can incorporate an entrainment hole and passage that lets air, or other gas, enter the region where the wall jet is or near where the wall jet is. The wall jet creates a pressure gradient so as to pull air from the other end of the passage. This mechanism can occur passively, or the air can be pushed into the passageway. It is cheaper to allow the air to be pulled passively. The air can come from the outside of the cylinder wall, as shown in FIGS. 2D and 2E, or through a wall of the device as shown in FIG. 2C. The air can also come from another source and travel down the inside of the wall, travel down conduits attached to the wall, or otherwise be guided to the entrainment hole via the passageway. The air can come out at a variety of positions and angles, such that when the air interacts with the wall jet the combined air and wall jet follows a path that lifts the wall jet from the surface sooner than if the entrainment hole was not there.

The hugging of the surface by the wall jet creates shear force, or drag. By having the air lift the wall jet away from the surface earlier, the amount of shear force is reduced and the velocity of the wall jet is increased. The creating of a normal component away from the surface to the velocity of the wall jet can reduce drag by 90%.

Embodiments can have a variety of shapes and distributions of entrainment holes proximate the exposed electrode and wall jet region. Specific embodiments can incorporate holes or slots providing air to 50% to 75% of the length of the electrode along a direction perpendicular to the wall jet flow, and/or one or more of the following: 75%-100%. 25%-50%, 0%-25%,50%-100%, or other percentages of the length of the electrode along a direction perpendicular to the wall jet flow.

Figure 2B:
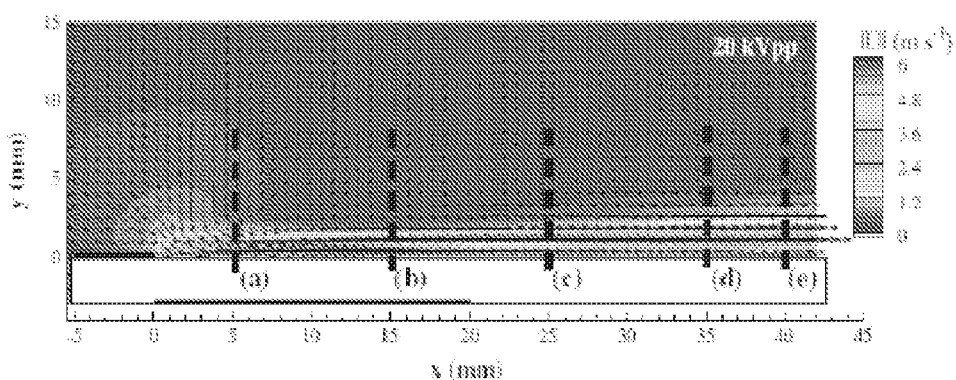
Figure 2C:
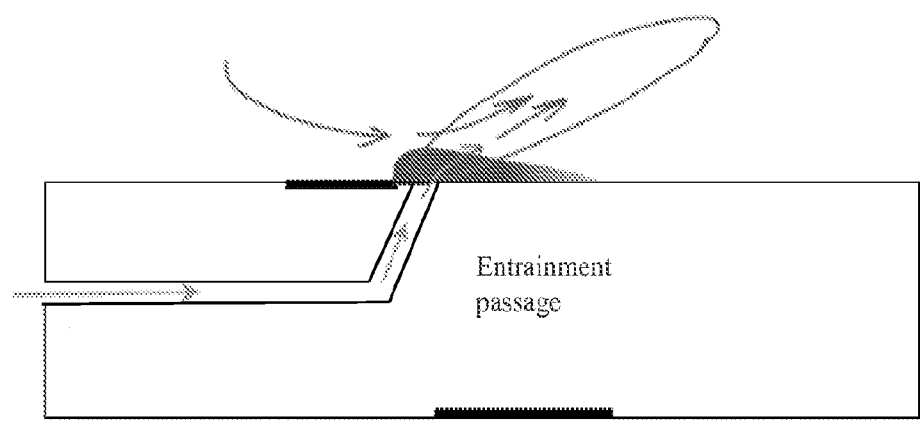
Figure 2D:
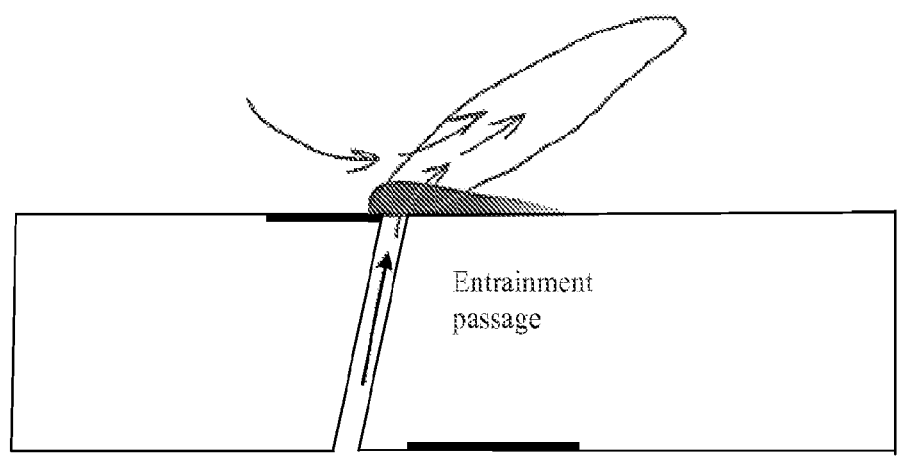
Figure 2E:
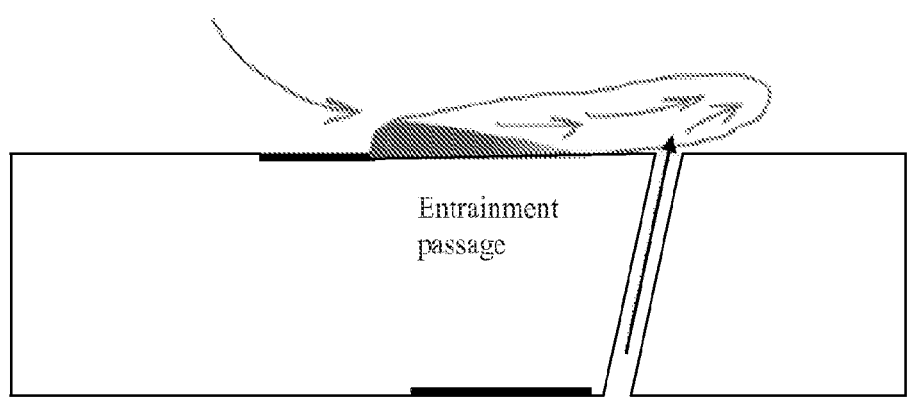

FIGS. 2A-2E illustrate surface flow manipulation using flow entrainment passages. FIG. 2A shows a local high induced velocity nearly parallel to the dielectric surface; FIG. 2B shows PIV results shown from actual testing (Durscher & Roy, 2012), showing details of stream wise velocity distribution for the embodiment of FIG. 2A with flow vectors overlay; FIG. 2C shows a larger region of upward vectored induced jet with higher velocity; FIG. 2D shows a larger region of upward vectored induced jet with higher velocity; and FIG. 2E shows results similar to the configuration of FIG. 2A, with an extended region of wall jet with higher velocity. FIG. 2B shows the stream is narrower and close to the surface.

FIG. 2A illustrates a configuration of a surface plasma actuator. The actuator has an exposed electrode and another electrode separated by the exposed electrode by a dielectric material. The exposed electrode can have a coating if desired. Embodiments of the subject invention can incorporate surface plasma generators as shown in FIG. 2A, as well as other configurations known in the art. Specific embodiments can incorporate one or more surface plasma actuators taught in U.S. patent application Ser. No. 13/578,797 (U.S. published patent application US 2012/0304618), filed on Aug. 13, 2012, and, in particular, embodiments can incorporate one or more surface plasma actuators shown in FIGS. 8, 11, 12, 13, 14, 15A, 15B, 16A, 16B, 17A, 17B, 18, 19, 20, 24, and/or 30 of U.S. patent application Ser. No. 13/578,797, which correspond to FIGS. 4, 5, 6, 7, 8, 9A, 9B, 10A, 10B, 11A, 11B, 12, 13, 14, 15, and/or 16 of the subject application.

The drag produced by a dielectric barrier discharge plasma actuator is due to the differential streamwise velocity generated by the induced wall jet. Embodiments of the invention can utilize a flow entrainment mechanism to alter the shear distribution along the surface of the actuator. Theoretical predictions for four different configurations, validated by experimental data collected under quiescent operating condition, show that the location of the entrainment holes greatly affects the velocity distribution near the actuator surface. For certain hole arrangement the jet directs upward and away from the surface. Specific embodiments can have at least 5%,10%,15%,20%, and/or 25% higher average velocity and 50%,60%,70%,80%, and/or 90% less integrated shear (drag).

Figure 3A:
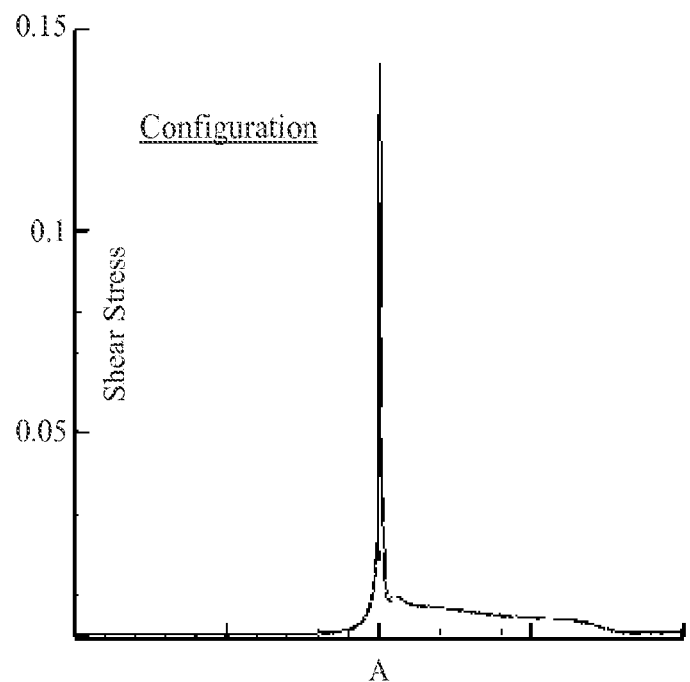
FIGS. 3A-3B show example numerical results for shear, indicating a drastic reduction for the configuration shown in FIG. 2A and the configuration shown in FIG. 2D.
Figure 3B:
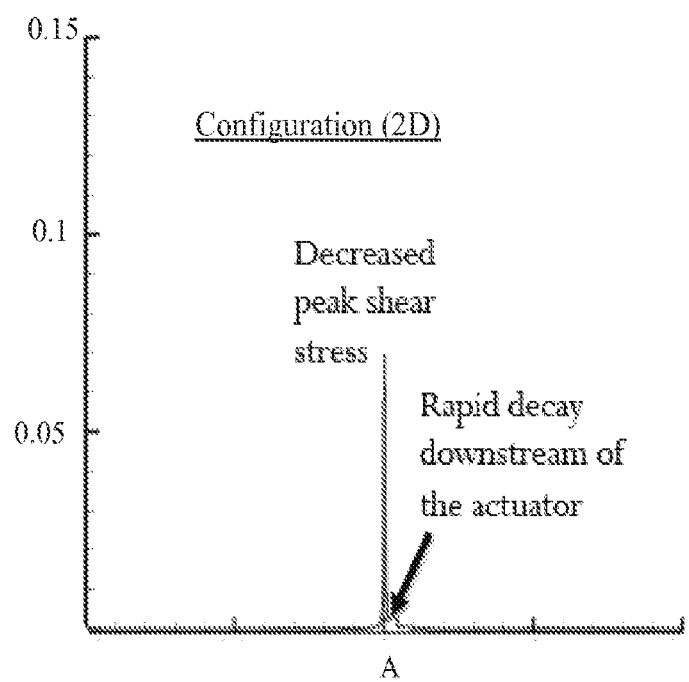

In comparison to the standard configuration, shown in FIG. 2A, embodiments with the entrainment holes, as shown in FIGS. 2C and 2D, show dramatic reduction in shear downstream of the exposed electrode, where the exposed electrode is shown to the left of the exit of the entrainment hole. The configuration shown in FIG. 2E, which incorporates an entrainment hole, actually increases shear, as the wall jet extends further, attaching to the dielectric surface for a longer distance. Example numerical results and experimental data for configuration shown in FIGS. 1A and the embodiment shown in FIG. 2D are shown in FIGS. 3A-3B, respectively, where A represents the edge of the electrode where the wall jet starts.

Embodiments can also provide a method and apparatus for dielectric barrier discharge actuation, and/or surface plasma actuation, where at least one electrode of the electrode pair is separated from the surface. Embodiments having an electrode separated from the surface, including a flat plate, a channel, and other surfaces, can allow for a thicker boundary layer, less induced wall shear, deeper penetration into the bulk flow region (allowing, e.g., higher control authority), both passive and active boundary layer control effect, and/or the use of a laser and/or electron beam as the electrode separated from the surface, than traditional surface plasma actuators.

FIGS. 17A-17D show side and top cross-section views where one electrode (A) is outside of a wall and the other electrode (B) is inside the volume in which a fluid, e.g., a gas or gas mixture is to have a force imparted to it to push the fluid (to the left in FIGS. 17A-17D). The walls can be made of an insulating material such as plexiglass, or quartz, or other material that allows a plasma to be created where a voltage is applied across A and B. Accordingly, some arcing can be useful, for example to initiate the plasma formation, but preferably arcing does not dominate. Although the voltage is shown as $\phi(\theta)$, any voltage that creates a plasma can be used, such as DC, pulsed DC, ac, and two ac voltages not out of phase by $\pi$. Although B is shown as having 5 cylindrical conductors, any number can be used; the conductors can have any cross-sectional shape and have the same cross-sectional shape or different cross-sectional shapes, such as two convex curves (e.g., like an eye) that allow the flow to pass with less blocking than a circular cross-section, a rectangle, hexagon, square, polygon or irregular; the same or different voltages can be applied to the different conductors, which can have the same or different frequencies. The cross-section shape can change along the length of the conductor. The conductor can be coated or not coated.

In embodiments, electrode A can be within the wall, or inside the volume, either in contact with the inner surface of the wall or not. The electrodes A and B can comprise a conductor, such as copper, aluminum, and/or tungsten, or other material that allows a plasma to be created. Electrode A can have a second portion (shown on top left of FIGS. 17A and 17C), or just have a single portion, or can have additional portions. Alternatively, the conductor shown on the top left of FIGS. 17A and 17C can be part of another electrode pair.

The embodiments shown in 17A-17D and 18A-18D can have near atmosphere pressure air (or other ionizable gas or gas mixture) in a region to be ionized by the electric field created by the voltage applied to the electrodes. In this way, the fluid is ionized and then the ions are pushed by the electric field such that an electrohydrodynamic force is applied so as to push the fluid in a direction parallel to the surface.

Figure 17B:
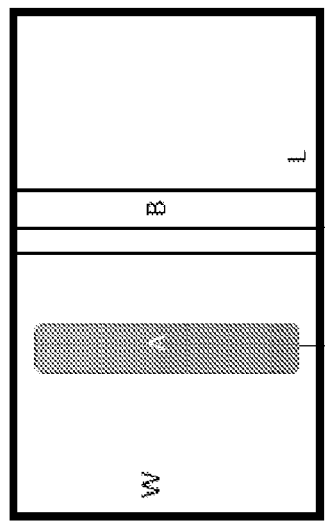
FIGS. 17A-17D show a cross-sectional view from the side for an embodiment where electrode A is grounded and a voltage (θ) is applied to electrode B, a cross-sectional view from the top of the embodiment of FIG. 17A, a cross-sectional view from the side for an embodiment where a voltage $\phi(\theta)$ is applied to electrode A and a voltage $\phi(\theta+\pi)$ is applied to electrode B, and a cross-sectional view from the top for the embodiment of FIG. 17C, respectively.
Figure 17D:
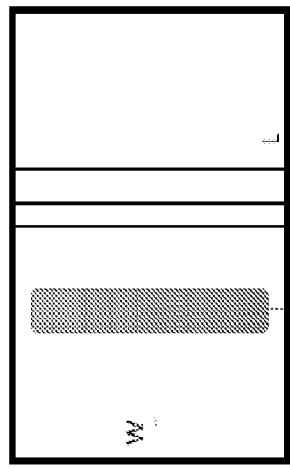
Figure 17A:
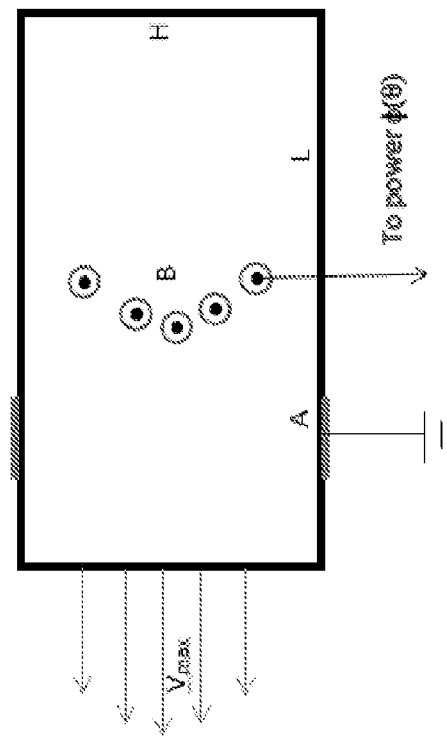
Figure 17C:
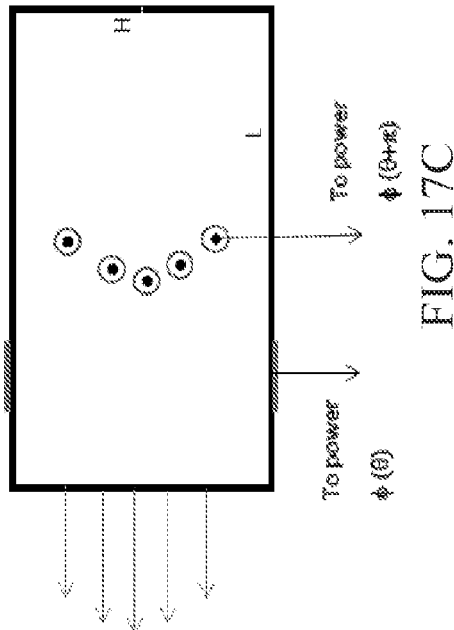

In a specific embodiment, referring to FIGS. 17A-17B, a channel has a width w=4 cm, length L=8 cm, and height H=6 mm, B is a single wire conductor positioned at a height of 3 mm and $\phi(\theta)$ has a frequency of 14 kHz. When $\phi(\theta)$ has peak to peak voltage kVpp of: 16 kVpp, Vmax of the air is 3 m/s; 22 kVpp, Vmax of the air is 5 m/s; 26 kVpp, Vmax of the air is 6 m/s; 30 kVpp, Vmax of the air is 8 m/s; and 32 kVpp, Vmax of the air is 10 m/s. Other embodiments can have a combination of dimensions, including: 1 µm≤H≤1 m, 1 mm≤W≤10 m, L≥1 mm, conductor diameters of less than 1 µm, 10 nm-1 mm, 10 nm-100 nm, 100 nm-1 µm, 1 µm-10 µm, 10 µm-100 µm, and/or 100 µm-1 mm. Pressures inside the channel or above the surface can be in the range less than 100 torr (which can allow the non-separated electrode to be in the channel or on top of the surface), in the range 100 torr-atm; within 1%,2%,5%,10%,15%,20%, and/or 25% of atmospheric pressure; and other pressures that allow a plasma to be created. The electrode can be separated from the surface a sufficient distance so that the fluid can be ionized, at least 0.1 mm, 0.2 mm, 0.3 mm, 0.4 mm, 0.5 mm, 0.6 mm, 0.7 mm, 0.8 mm, 0.9 mm, 1.0 mm, 2 mm, 3 mm, 4 mm, 5 mm, 6 mm, 7 mm, 8 mm, 9 mm, 10 mm, 100 mmm, 200 mm, 300 mm, 400 mm, 500 mm, 600 mm, 700 mm, 800 mm, 900 mm, and/or 1 cm.

The electrodes in the embodiment of FIGS. 1A and 1B, or other related embodiment for flowing a fluid in a channel can utilize: one or more conductors separated from the wall, such as ring conductors held in position by, for example, insulators extending from the walls, a structure inserted into the channel, or otherwise held in position; a laser beam and/or electron beam generated in the desired position, such as parallel to the axis of the channel; one or more ring, or axial, electrodes on the inner surface (optionally coated) or proximate the inner surface pair with electrodes within the wall of the channel or on the outside of the wall.

Figure 18B:
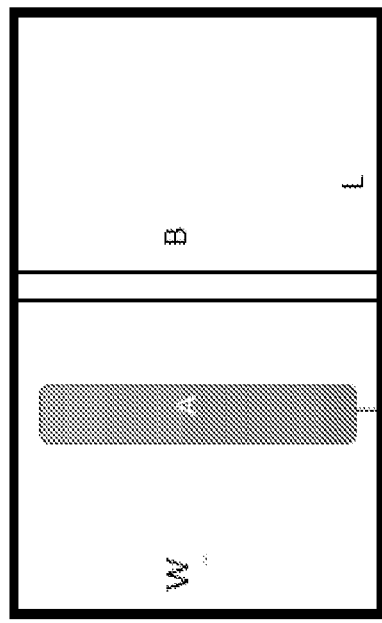
FIGS. 18A and 18B show a cross-sectional view from the side for an embodiment where electrode A is grounded (or has a voltage $\phi(\theta)$ applied) and a voltage (θ) (or voltage $\phi)(\theta+\pi)$) is applied to electrode B and a cross-sectional view from the top of the embodiment of FIG. 18A, respectively, for an embodiment similar to FIGS. 17A-17D.
Figure 18D:
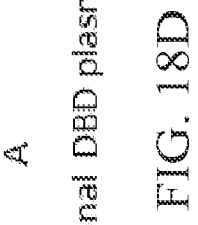
FIGS. 18C and 18D show a cross-sectional view from the side for an embodiment where a voltage $\phi(\theta)$ is applied to electrode A (or A is grounded) and a voltage $\phi(\theta+\pi)$ (or voltage $\phi(\theta)$) is applied to electrode B, and a cross-sectional view from the top for the embodiment of FIG. 18C, respectively, for a flat surface.
Figure 18A:
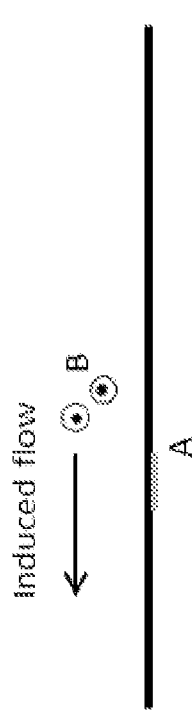
Figure 18C:
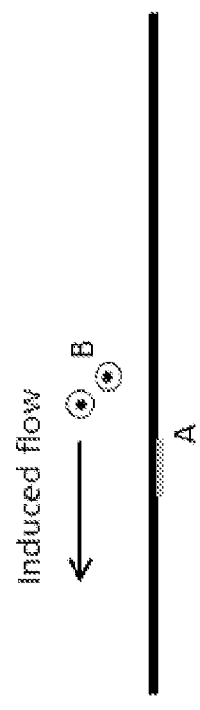

FIGS. 18C and 18D show an embodiment incorporating an electrode B that has two conductors separated from the surface and electrode A on the outside of the flat plate. Advantages that can be achieved by separating the electrode B from the surface, which also apply to other embodiments (such as FIGS. 17A-17D and 18A-18B), include: a thicker boundary layer than the traditional very this plasma induced near wall jet causing boundary layer, where the boundary layer can be 1, 2, 3, 4, 5, 6, 7, 8, 9, 10, or more cm thick; less induced wall shear; deeper penetration into the bulk flow (due for example to the thicker boundary layer), which allows for higher control authority; both passive and active boundary layer control, where the electrodes that are separate from the surface can passively control the movement of the boundary layer flow (e.g., mechanically guide the flow or trip the flow); active control of boundary layer flow (where boundary layer is how far off the surface the peak velocity of the flow is) can be achieved by applying voltages to the electrodes that create a plasma and/or applying voltages to the electrodes that do not create a plasma, but still create an E-field; the use of spiraled wires, spiraled ribbons, or other electrode structure that can be used to create a three-dimensional flow control effect; apply a voltage across two electrodes that are both separated from the surface, which allows more versatility in placement of the plasma and electric field; the use of a laser beam and/or electron beam as the electrode, which can allow a moving electrode that moves in a variety of manners; and a moving electrode even when a solid conductor is used, which can allow switching and/or redirecting of flow.

Figure 4:
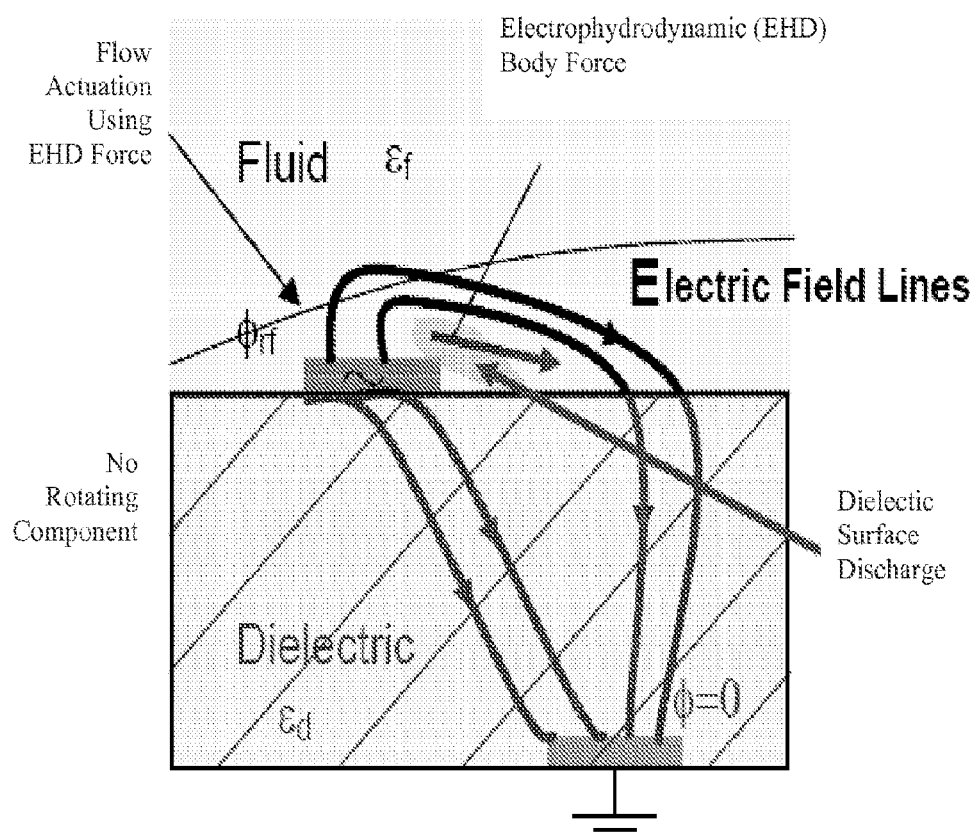
FIG. 4 is a schematic diagram for flow actuation using surface dielectric barrier discharge (DBD).
Figure 8:
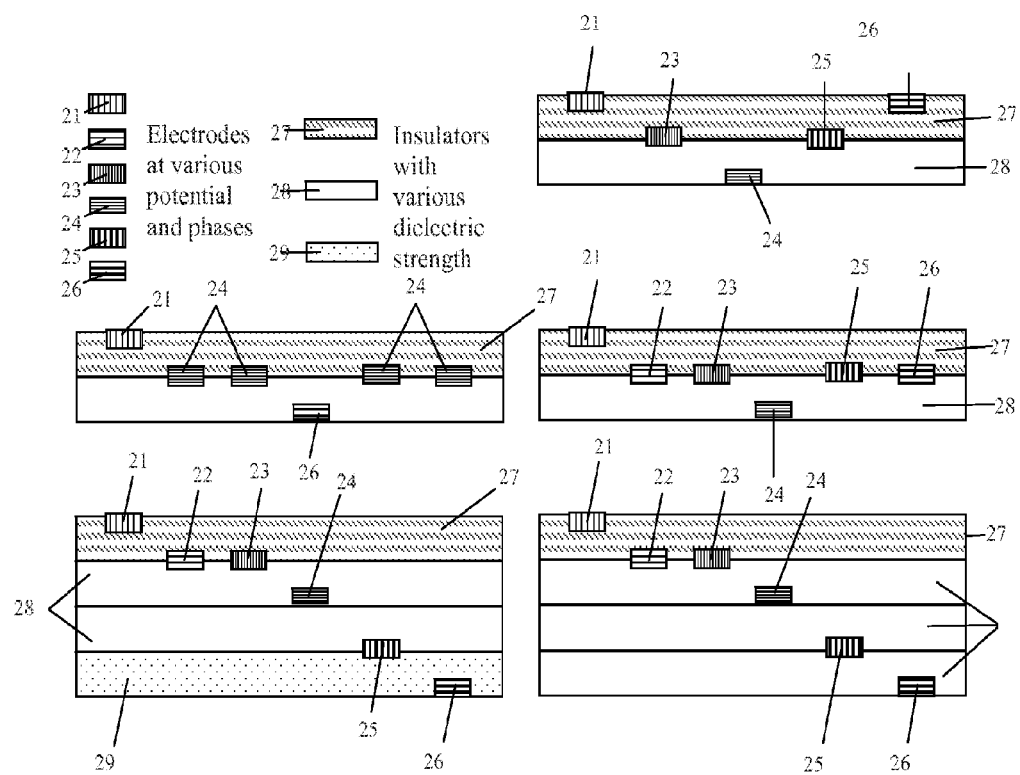
FIG. 8 illustrates several additional exemplary embodiments of the multilayer actuators of the present disclosure.

FIG. 4 of the subject invention (and FIGS. 8-10 of U.S. patent application Ser. No. 13/578,797 (U.S. published patent application US 2012/0304618) illustrate the process through which an electrodynamic qE body force actively controls the flow through an inducement of a wall jet in a quiescent condition. FIG. 4 shows the schematic for flow actuation using surface dielectric barrier discharge (DBD). Two electrodes are employed: the first exposed to the flow and the second embedded in the dielectric and displaced in the streamwise direction relative to the exposed electrode. The surface discharge so created contrasts with the volumetric effect observed when the electrodes are separated by the fluid. Typically, the actuator is excited by powering the exposed electrode at RF voltages, while the embedded electrode is grounded. In another arrangement, both electrodes are powered with signals separated by a beat frequency. The excitation induces a complex unsteady interaction between the two electrodes and the fluid, details of which depend on frequency, voltage, geometric configuration, and dielectric constants of the media.

In the surface discharge, within a very short time after breakdown, the discharge buildup at the dielectric surface sets off microdischarges of nanosecond duration, limiting the electric field at the location of the microdischarge such that the charge current at this position is cut off. Experimental evidence shows that there is no runaway state for the parameters under consideration and that an asymptotic (quasi) periodic state is reached, with a dominant frequency that is locked to the input perturbation. For a given inter-electrode distance, as the applied voltage becomes sufficiently large, the dielectric surface adjacent to the RF electrode produces a barrier discharge, which weakly ionizes the surrounding gas. The combination of electrodynamic body force and collisional processes, whose detailed mechanics remain a matter of current research, ultimately transfers momentum acquired from the electric field by the charged particles to the neutrals which are the primary species.

Advantages of dielectric barrier-based discharges include, for example, an absence of moving parts, rapid on-off features, and the ability to apply body forces in a relatively precise manner by deploying advanced electromagnetic technology. Embodiments of the subject invention are thus suitable for flow control in micro channels or expansion slots, for example. The electric field E exerts a net force qE through the space charge (q) separated plasma within the DBD. This microfilamentary discharge sustains an optical glow within a half cycle through many current pulses of nanosecond duration. The plasma can induce air flow up to several meters per second in atmospheric pressure. The parameters controlling such force include the applied voltage, frequency, dielectric characteristics, and the asymmetric configuration of the electrodes. The asymmetry in the location of the electrodes, coupled with the phase shift of the electrode when multiple devices are present, yields a directional asymptotic "push" on the bulk gas. The thickness of the exposed electrode affects the thrust produced by the actuator.

The variation of electric body force qE about the electrode-dielectric surface in FIG. 9 of U.S. patent application Ser. No. 13/578,797 (U.S. published patent application US 2012/0304618) is predicted by using a multispecies formulation anchored in a high-fidelity finite element based multiscale ionized gas (MIG) flow code. The MIG code employs a self-consistent approach to model the near-wall physics of plasma gas interactions. The method is based on a versatile finite-element (FE) procedure adapted from fluid dynamics to overcome the stiffness of the equations generated by multi-species charge separation phenomena. A 2D bilinear finite element formulation is chosen with $4^{th}$ order Runge-Kutta time marching. The solution process consists of two steps. The first solves the equations for charge and electric field simultaneously. In the second step, the force so obtained is transferred to the airfoil after rotation and scaling. The MIG code also solves for the self-consistent fluid response. This implicitly assumes that the near-wall local fluid neutral velocity does not influence the distribution of electric parameters. This requires that the fluid density and pressure, or collisionality, are not much different from those employed in the plasma calculation.

The result computed for helium working gas describes a localized peak of the body force in the vicinity of the exposed electrode powered with a RF voltage of 1 kV rms at 5 kHz. The predicted streamwise gas velocity profiles induced by this force are shown along different locations in FIG. 10 of U.S. patent application Ser. No. 13/578,797 (U.S. published patent application US 2012/0304618) under a quiescent gas environment. For atmospheric air, the induced peak velocity of the wall jet is about 1-2 m/s, which may be further accentuated by using a polyphase power supply. While this creates striking flow control effects at low speeds, the induced momentum may be too small for sufficiently actuating the high speed flows.

A first principle electrohydrodynamic (EHD) formulation can be used for modeling plasma discharge induced flows. Reported experiments and theoretical predictions have been traditionally limited to low speeds and low power due to the problems of arcing and low conversion of electrical energy into gas momentum. Thus, the embodiments of the subject invention are directed to multibarrier actuators using several layers of dielectric barriers with embedded electrodes for moderate to high speed applications. Embodiments of the subject multibarrier actuators may vary in the number of insulation layers, insulation thickness, dielectric strength, number of electrodes, electrode width, electrode gap, applied frequency, duty cycle, and voltage, for example.

Traditionally, in electrical glow discharge, a DC voltage potential is placed across two electrodes. If the voltage potential is gradually increased, at the breakdown voltage $V_B$, the current and the amount of excitation of the neutral gas becomes large enough to produce a visible plasma. According to Paschen's law, the breakdown voltage for a particular gas depends on the product (p.d) of the gas pressure and the distance between the electrodes. For any gas, there is a unique p.d value referred to as the Stoletow point where volumetric ionization is the maximum. The Stoletow point for air requires a minimum $V_B$=360 V and p.d=5.7 Torr-mm.

For flow control applications near atmospheric pressure, the allowable electrode spacing necessary for maximum volumetric ionization is d=0.077 mm. In many applications, this is an impractical limitation. One solution to this limitation comes from the development of RF glow discharge using an a.c. voltage potential across the electrodes. The frequency of the current should be such that within a period of the a.c. cycle, electrons travel to the electrodes and generate a charge, while the heavier ions do not. Based on reported experiments, the time-averaged plasma parameters for atmospheric glow discharge has air or other gases at 760±25 ton with relative humidity below 14%. A homogeneous glow can be maintained at about 3 to 10 kHz RF and rms electrode voltage between about 3 to 16 kV. For a gap distance of about 2-5 mm, the electron number density is $\sim 10^{17}$ m$^{-3}$ and volumetric power dissipation is about 1 MW/m$^3$.

Figure 5:
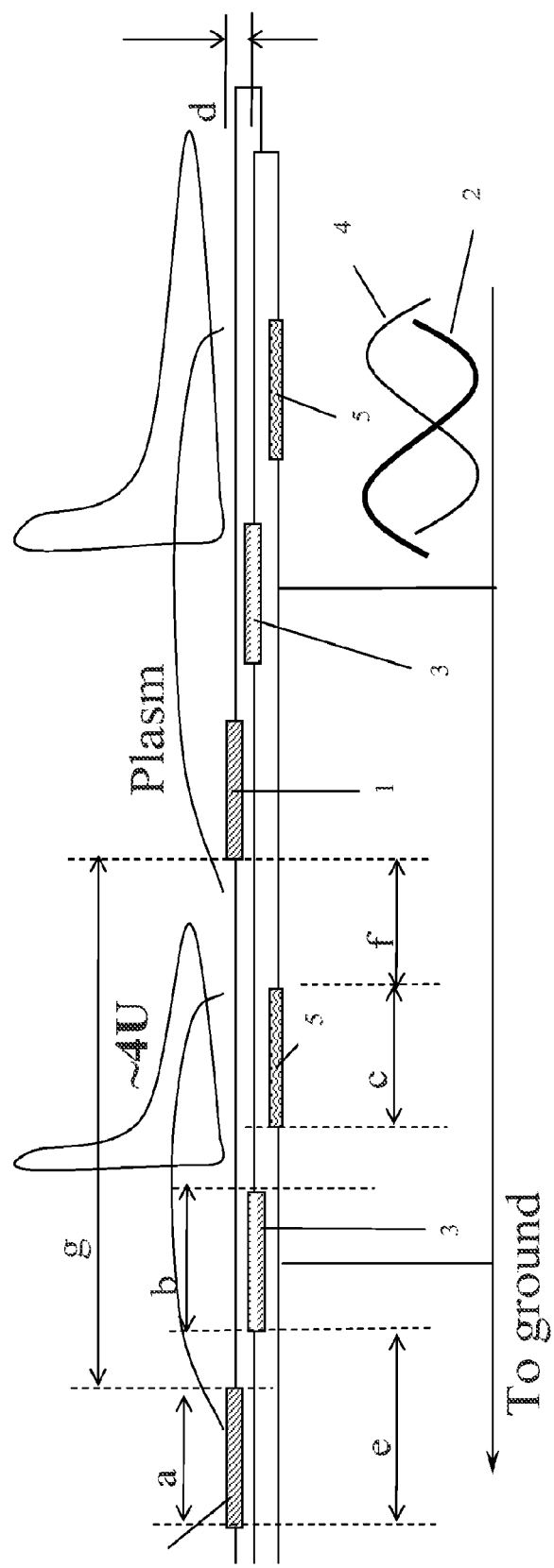
FIG. 5 is a schematic diagram of one embodiment of a multilayer actuator in accordance with the subject invention.

In an embodiment, a multilayer actuator is designed with several layers of dielectric, each incorporating an electrode. FIG. 5 of the subject application (and FIG. 11 of U.S. patent application Ser. No. 13/578,797 (U.S. published patent application US 2012/0304618) shows a schematic for one embodiment of a bi-layer design as an example. The inter-electrode distance d is kept at a few microns, thereby reducing or eliminating the kHz RF power requirement. In a preliminary experiment, the electrodes are powered with wall ac supply (60 Hz) through neon transformers and tested for a stable glow. The voltage pattern 2 shown at the bottom right of FIG. 5 is applied between the electrode 1 nearest the surface and the ground electrode 3 in the middle of the dielectric layers, while voltage pattern 4 is applied between the electrode 5 farthest from the surface and the ground electrode 3. The electrode 1 nearest the surface can be exposed to the fluid in the flow region or can have a coating separating the electrode 1 surface from the fluid in the flow region, depending on the fluid properties (e.g., electrical conductivity) and other design parameters. The stable discharge at single phase power induces a significantly large body force in an extended region, resulting in a possible order of magnitude increase in wall jet velocity with minimum arcing. Initial measurements show at least four times increase in the induced jet velocity (~4U). By using a set of phase lagged electrodes powered by a pulsed ac/dc supply, the induced wall jet can be improved by an order of magnitude, such as up to about 7-10 m/s.

Figure 6:
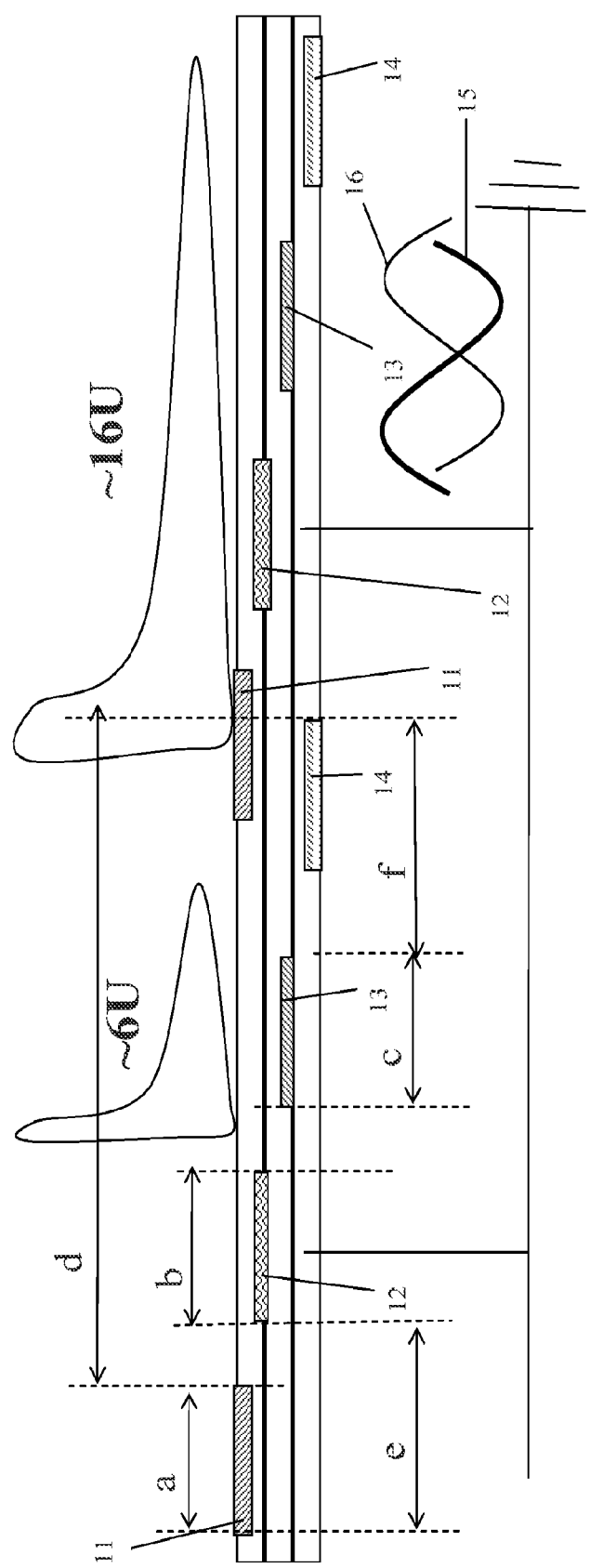
FIG. 6 is a schematic diagram of a second embodiment of a multilayer actuator of the present disclosure, with an increased number of layers.
Figure 12:
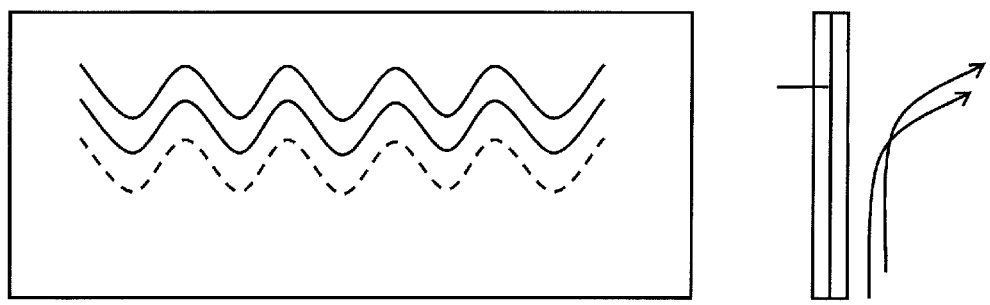
FIG. 12 shows a specific embodiment having a serpentine turbulator design for creating a flow force directed away from the substrate.

FIG. 6 of the subject application (and FIG. 12 of U.S. patent application Ser. No. 13/578,797 (U.S. published patent application US 2012/0304618) shows an extremely large acceleration gain (i.e. >15U induced velocity) for the multilayer arrangement. The voltage pattern 15 is applied between the electrode 11 nearest the surface and the ground electrode 13, while the voltage pattern 16 is applied between electrode 12 and the ground electrode 13. This may be achieved for the same energy density of plasma as of a monolayer arrangement. In additional embodiments, the number of layers can be increased to increase the plasma coated surface area. This means more EHD body force and resulting gas velocity are induced. Also, at this velocity, small scale turbulence may dominate the flow actuation process. Further, the micron level insulator thickness may influence the induced force. The electrodes can be positioned and driven in a variety of configurations and patterns, respectively, to induce a variety of flow patterns. In embodiments, as discussed above, such electrodes can be positioned on various surfaces making up a propulsion system. For example, such electrodes can be positioned on a propellant tank, drain/fill valve, filter assembly, control valve, micro channel, expansion slot, or other conduit used in the propulsion system.

Figure 7:
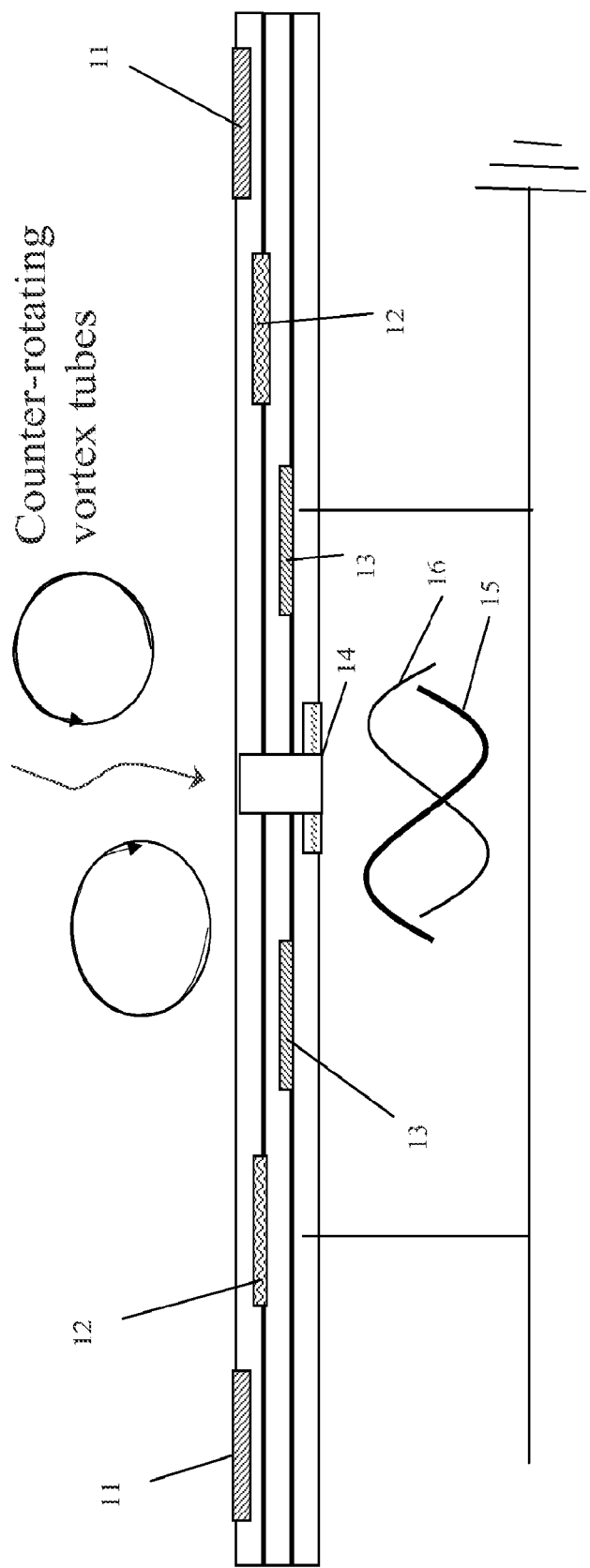
FIG. 7 is a schematic diagram showing that flow actuation may be used for creating large or small counter rotating vortices.
Figure 13:
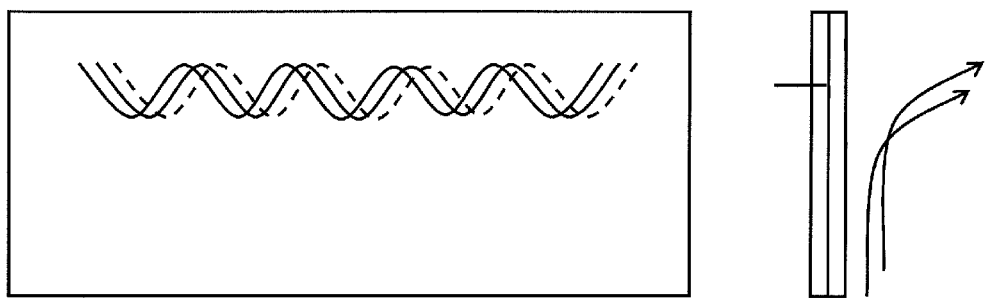
FIG. 13 shows a specific embodiment having a serpentine turbulator design for creating a flow force directed toward the substrate.

As an example, as shown in FIG. 7 of the subject application (and FIG. 13 of U.S. patent application Ser. No. 13/578,797 (U.S. published patent application US 2012/0304618), flow actuation may be used for creating large or small counter rotating vortices. As discussed above, in embodiments, such vortices can be used to direct flow into or out of a conduit such as an expansion slot, micro channel, or other conduit. Based on the applied phase difference, these counter rotating vortex tubes can be slightly or greatly misaligned. In an embodiment, various vortex structures similar to those forming about different body shapes can be created. For example, the Karman vortex street for flow over a cylindrical object can be easily generated for electrode sets operating at a phase difference of π/2 with a select duty cycle. A powerful alternative for the synthetic jets can also be implemented with this design.

Figure 14:
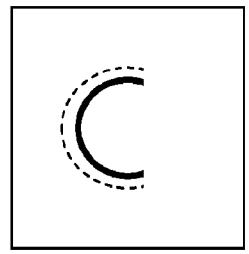
FIG. 14 shows various specific embodiments of the subject invention.
Figure 14:
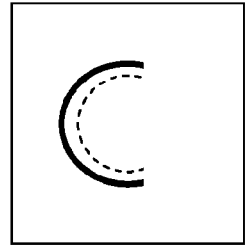
Figure 14:
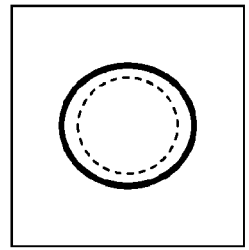
Figure 14:
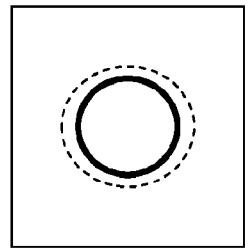
Figure 14:
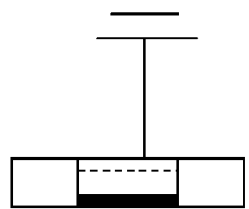
Figure 14:
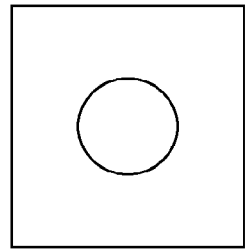

FIG. 8 of the subject application (and FIG. 14 of U.S. patent application Ser. No. 13/578,797 (U.S. published patent application US 2012/0304618) illustrates several additional exemplary embodiments of the multilayer actuators in accordance with the subject invention, showing various geometric and electrical configurations. Various insulator materials such as KAPTON™ and TEFLON™ and their combinations, for example, can be utilized for minimum heat loss inside the dielectric material. Multilayer actuators of the present invention may have any number of insulation layers, insulation thicknesses, dielectric strengths, numbers of electrodes, electrode widths, inter-electrode gaps, applied frequencies, duty cycles, and voltages, for example. In an embodiment, such structures are applied to an interior surface of a micro channel, expansion slot, or other conduit to induce flow through the conduit.

Figure 9A:
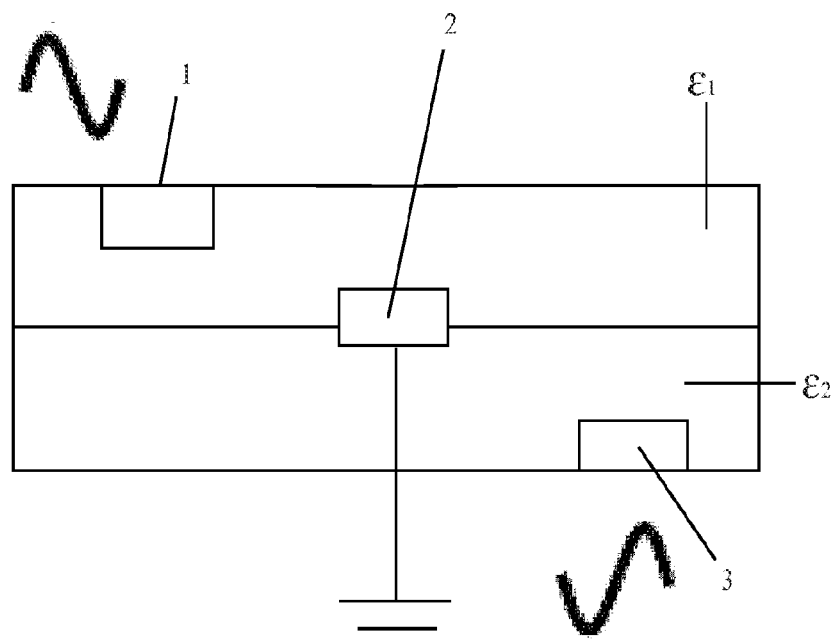
FIGS. 9A and 9B show specific embodiments of the invention having certain relationships between driving voltage and amplitudes and frequencies.
Figure 9B:
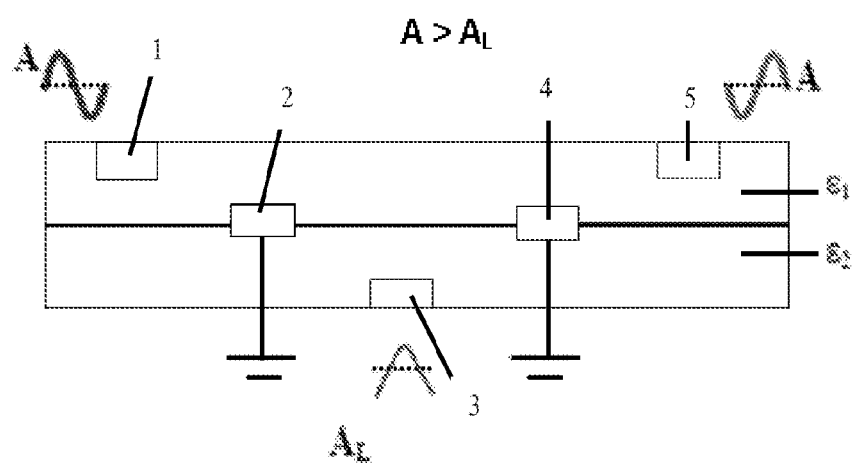

Referring to FIG. 9A of the subject application (and FIG. 15A of U.S. patent application Ser. No. 13/578,797 (U.S. published patent application US 2012/0304618), an embodiment is shown where the amplitude, A, and frequency, k, of the voltage applied between electrodes 1 and 2 and between electrodes 3 and 2 is the same. FIG. 9B of the subject application (and FIG. 15B of U.S. patent application Ser. No. 13/578,797 (U.S. published patent application US 2012/0304618) shows an embodiment where the amplitude, $A_L$, and frequency, $k_L$, applied between electrodes 3 and 2 is different than the amplitude, A, and frequency applied between electrodes 1 and 2 and electrodes 5 and 4.

Figure 10A:
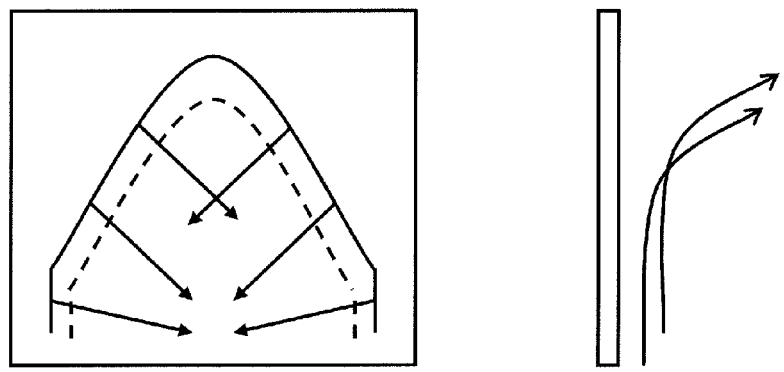
FIGS. 10A and 10B show specific embodiments of the invention for creating a flow force directed away from the substrate.
Figure 10B:
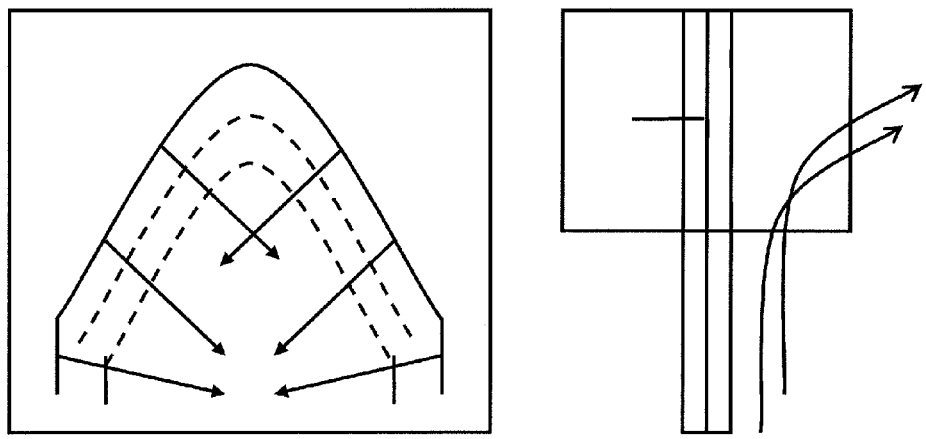

Additional embodiments of the invention can involve electrode structures incorporating curvatures or angles, such as triangle, square, or angle, with respect to the longitudinal dimension of the electrode pattern. Referring to FIGS. 10A and 10B of the subject application (and FIGS. 16A and 16B of U.S. patent application Ser. No. 13/578,797 (U.S. published patent application US 2012/0304618), electrode patterns incorporating such curvatures are shown. FIG. 10A illustrates an electrode pattern having a cross-section as shown in the right side of FIG. 10A, where the longitudinal dimension of the electrode pattern incorporates a curvature, as shown on the left side of FIG. 10A. FIG. 10B shows an electrode pattern having a cross-section as shown in the right side of FIG. 10B, where the longitudinal dimension of the electrode pattern incorporates a curvature, as shown on the left side of FIG. 10B. The electrode patterns in FIGS. 10A and 10B can be used for bulk flow actuation and can create an upward body force away from the surface. The fluid receives a force from a plurality of directions such that fluid collides and is forced upward from surface or down toward surface. The arrows in FIGS. 10A and 10B show the direction of the flow when looking at a cross-section cut from the top to bottom of the respective electrode pattern with the ground electrode being on the inside of the curvature.

Figure 11A:
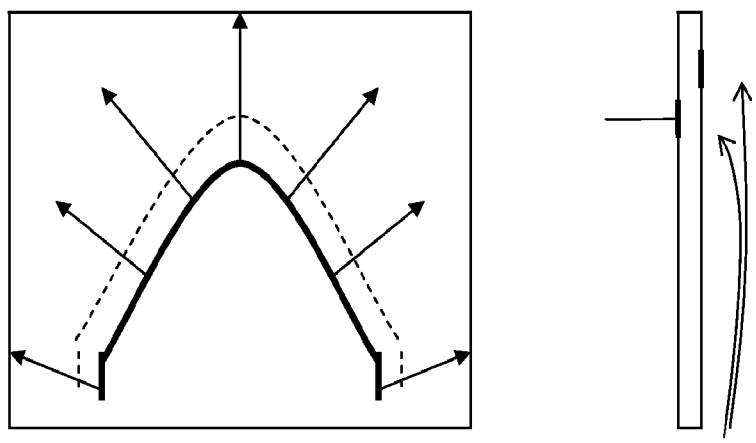
FIGS. 11A and 11B show specific embodiments of the invention for creating a flow force directed toward the substrate.
Figure 11B:
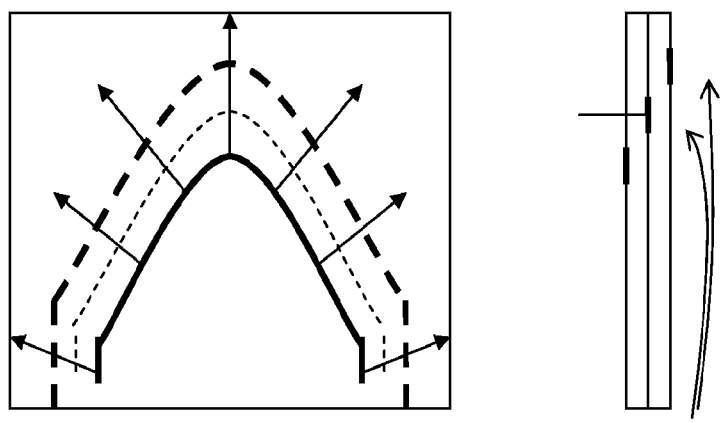

FIGS. 11A and 11B of the subject application (and FIGS. 17A and 17B of U.S. patent application Ser. No. 13/578,797 (U.S. published patent application US 2012/0304618) show the electrode patterns of FIGS. 10A and 10B, respectively, with the ground electrode being on the outside of the curvature in FIG. 11A and the electrode driven to create a body force from the inner electrode to the outer electrode. The arrows shown in FIGS. 11A and 11B show the flow created by driving the electrode structures in this manner.

FIG. 12 of the subject application (and FIG. 18 of U.S. patent application Ser. No. 13/578,797 (U.S. published patent application US 2012/0304618) shows an electrode structure having a serpentine turbulator design in the longitudinal dimension. The arrows on the right side show the flow for a cross-section cut from top to bottom where the electrodes are driven to produce a body force from the outer electrode to the inner electrode with respect to one of the curved sections. FIG. 13 of the subject application (and FIG. 19 of U.S. patent application Ser. No. 13/578,797 (U.S. published patent application US 2012/0304618) shows another embodiment having a serpentine turbulator design in the longitudinal dimension where the electrodes have a different orientation from the electrode pattern in FIG. 12. The arrows show the flow for a cross-section out from top to bottom at a location where the body force is away from the surface.

A variety of curvatures can be implemented in accordance with the subject invention. FIG. 14 of the subject application (and FIG. 20 of U.S. patent application Ser. No. 13/578,797 (U.S. published patent application US 2012/0304618) shows additional embodiments of electrode patterns incorporating curvatures in the longitudinal dimension of the electrodes, including an electrode pattern surrounding an aperture in the substrate and an electrode pattern in the shape of a half circle. Other shapes include, but are not limited to, angles, triangles, rectangles, polygons, and other shapes that vary from straight. The electrode pattern surrounding the aperture can be designed and driven to pull flow up through the aperture or driven to force flow into the aperture. Likewise, the electrode pattern in the half circle can be designed and driven to force flow away from the substrate or designed and driven to pull flow toward the substrate.

Figure 15:
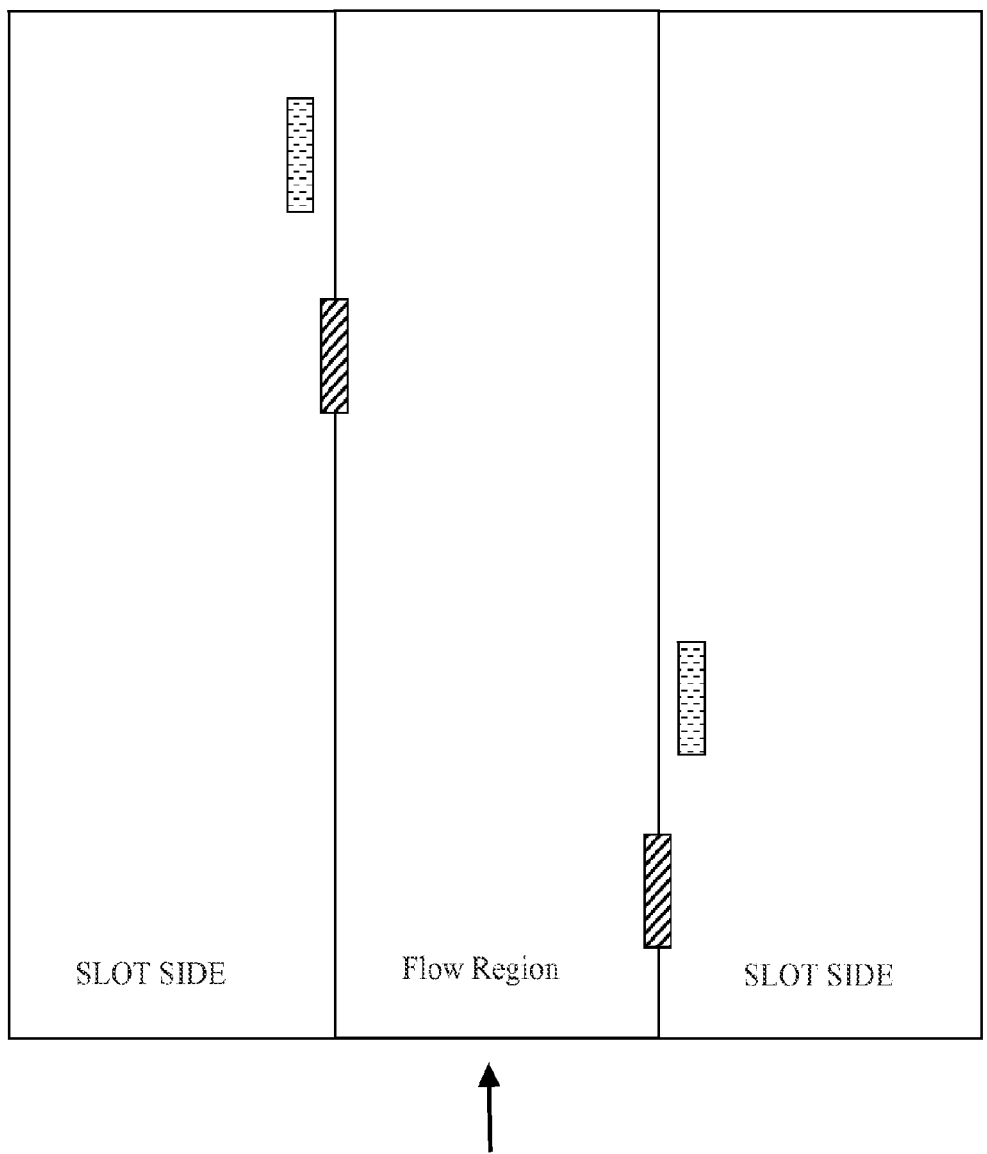
FIG. 15 shows a schematic diagram of a conduit configured to use a DBD in accordance with an embodiment of the subject invention.
Figure 16:
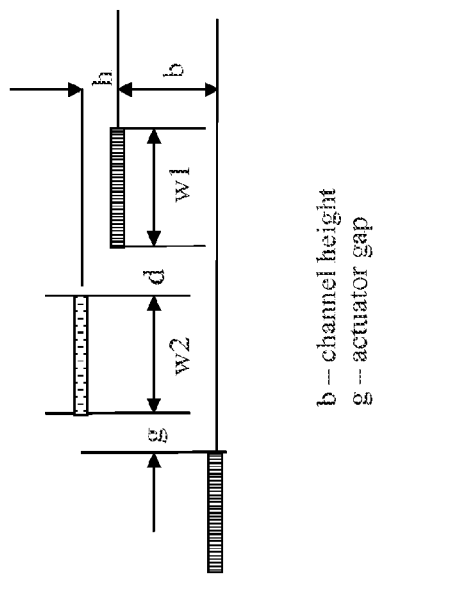
FIG. 16 shows a schematic of a conduit design according to an embodiment of the subject invention.
Figure 16:
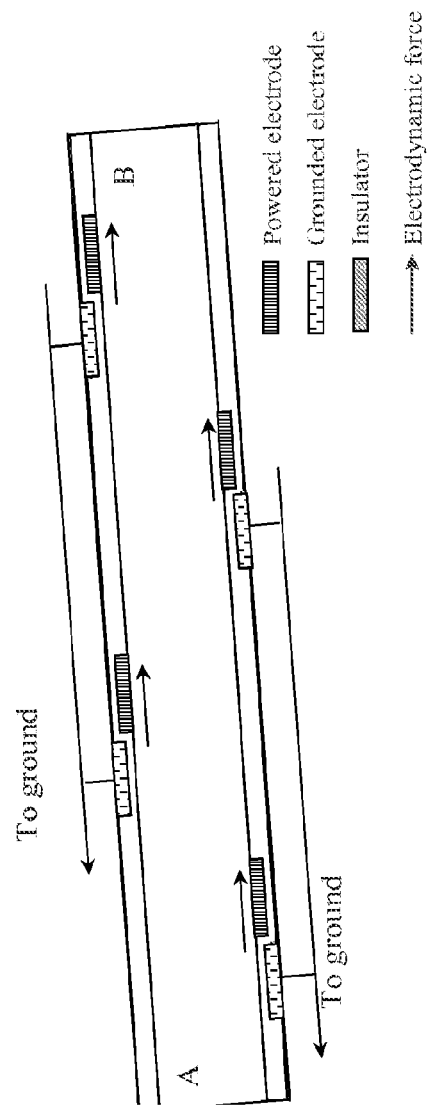

FIG. 15 of the subject application (and FIG. 24 of U.S. patent application Ser. No. 13/578,797 (U.S. published patent application US 2012/0304618) shows a schematic diagram of a conduit, such as a micro channel, expansion slot, or other conduit, configured to use a DBD in accordance with an embodiment of the subject invention. In the embodiment shown, two pairs of electrodes are formed in surfaces of the conduit. In an embodiment, the pairs of electrodes are powered to produce a DBD that induces flow of a propellant through the conduit. In an embodiment, the pairs of electrodes are powered in parallel. In an embodiment, the pairs of electrodes are powered sequentially. In an embodiment, multilayer actuators, such as the multilayer actuators discussed above, are formed in surfaces of the conduit.

Embodiments

Embodiment 1. A plasma actuator, comprising:
a curved surface;
a pair of electrodes;
a voltage source configured to apply a voltage across the pair of electrodes; and
at least one magnet,
wherein the at least one magnet is positioned with respect to the curved surface such that a magnetic field is created in a region above the curved surface, wherein the pair of electrodes are positioned with respect to the curved surface, such that when the voltage source applies the voltage across the pair of electrodes, when an ionizable gas and/or gas mixture near or at atmospheric pressure is located in the region above the curved surface, an electric field is created in the region above the curved surface that creates a plasma having electrons and positive ions, wherein the electric field pushes the electrons such that the electrons obtain a velocity having a velocity component due to the electric field, wherein the electrons are pushed by the magnetic field such that the electrons are moved closer to the curved surface such that charge separation is increased, wherein the increased charge separation increases a space charge created electric field component, wherein an increased force applied to the positive ions by the space charge created electric field component enhances a thrust applied to the ionizable gas and/or gas mixture.

Embodiment 2. The plasma actuator according to Embodiment 1,
wherein the at least one magnet comprises a permanent magnet.

Embodiment 3. The plasma actuator according to Embodiment 1,
wherein the at least one magnet comprises an electromagnet.

Embodiment 4. A plasma actuator, comprising:
a surface;
a pair of electrodes;
a voltage source configured to apply a voltage across the pair of electrodes; and
at least one magnet,
wherein the at least one magnet is positioned with respect to the surface such that a magnetic field is created in a region above the surface, wherein the pair of electrodes are positioned with respect to the curved surface, such that when the voltage source applies the voltage across the pair of electrodes, when an ionizable gas and/or gas mixture near or at atmospheric pressure is located in the region above the surface, an electric field is created in the region above the surface that creates a plasma having electrons and positive ions, wherein the electric field pushes the electrons such that the electrons obtain a velocity having a velocity component due to the electric field, wherein the electric field pushes the positive ions such that the positive ions obtain an ion velocity having an ion velocity component due to the electric field, wherein the positive ions are pushed by the magnetic field in a direction of flow.

Embodiment 5. The plasma actuator according to Embodiment 4, wherein the surface is a curved surface, wherein when the electric field pushes the electrons the electrons move closer to the curved surface such that charge separation is increased, wherein the electrons are pushed by the magnetic field in a direction of flow, wherein the increased charge separation increases a space charge created electric field component, wherein an increased force applied to the positive ions by the space charge created electric field component enhances an ion velocity component due to the electric field, wherein the enhancement in the ion velocity component due to the electric field increases a force applied to the positive ions by the magnetic field that increases thrust applied to the ionizable gas and/or gas mixture.

Embodiment 6. A plasma actuator, comprising:
a surface;
a pair of electrodes;
a voltage source configured to apply a voltage across the pair of electrodes; and
at least one aperture in the surface,
wherein the pair of electrodes are positioned with respect to the surface, such that when the voltage source applies the voltage across the pair of electrodes, when an ionizable gas and/or gas mixture near or at atmospheric pressure is located in the region above the surface, an electric field is created in the region above the surface that creates a plasma and an electrohydrodynamic force that pushes the ionizable gas and/or gas mixture to create a flow of the ionizable gas and/or gas mixture, wherein the at least one aperture is positioned with respect to the surface such that the flow creates a pressure that pulls a second gas or gas mixtureout of the aperture and entrains the second gas and/or gas mixture such that shear between the flow and the surface is reduced.

Embodiment 7. The plasma actuator according to Embodiment 6, wherein the second gas and/or gas mixture is the same as the ionizable gas and/or gas mixture.

Embodiment 8. The plasma actuator according to Embodiment 6, wherein the second gas and/or gas mixture is pumped out through the aperture and is entrained in the flow.

Embodiment 9. A plasma actuator, comprising:
a surface;
a pair of electrodes, wherein at least one electrode of the pair of electrodes is separated from the surface;
a voltage source configured to apply a voltage across the pair of electrodes; and
wherein the pair of electrodes are positioned with respect to the surface, such that when the voltage source applies the voltage across the pair of electrodes, when an ionizable gas and/or gas mixture near or at atmospheric pressure is located in the region above the surface, an electric field is created in the region above the surface that creates a plasma and an electrohydrodynamic force that pushes the ionized gas and/or gas mixture to create a flow of the ionizable gas and/or gas mixture.

Aspects of the invention, such as driving the surface plasma actuators and/or electromagnets, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:
1. A plasma actuator, comprising:
a curved surface;
a pair of electrodes;

a voltage source configured to apply a voltage across the pair of electrodes; and at least one magnet, wherein the at least one magnet is positioned with respect to the curved surface such that a magnetic field is created in a region above the curved surface, wherein the pair of electrodes are positioned with respect to the curved surface, such that when the voltage source applies the voltage across the pair of electrodes, when an ionizable gas;

an ionizable gas mixture; or an ionizable gas and an ionizable gas mixture, near or at atmospheric pressure is located in the region above the curved surface, an electric field is created in the region above the curved surface that creates a plasma having electrons and positive ions, wherein the electric field pushes the electrons such that the electrons obtain a velocity having a velocity component due to the electric field, wherein the electrons are pushed by the magnetic field such that the electrons are moved closer to the curved surface such that charge separation is increased, wherein the increased charge separation increases a space charge created electric field component, and wherein an increased force applied to the positive ions by the space charge created electric field component enhances a thrust applied to:

the ionizable gas;

the ionizable gas mixture; or the ionizable gas and the ionizable gas mixture, respectively.

2. The plasma actuator according to claim 1, wherein the at least one magnet comprises a permanent magnet.

3. The plasma actuator according to claim 1, wherein the at least one magnet comprises an electromagnet.

4. A plasma actuator, comprising:

a surface;

a pair of electrodes;

a voltage source configured to apply a voltage across the pair of electrodes; and at least one magnet, wherein the at least one magnet is positioned with respect to the surface such that a magnetic field is created in a region above the surface, wherein the pair of electrodes are positioned with respect to the surface, such that when the voltage source applies the voltage across the pair of electrodes, when: an ionizable gas;

an ionizable gas mixture; or an ionizable gas and an ionizable gas mixture, near or at atmospheric pressure is located in the region above the surface, an electric field is created in the region above the surface that creates a plasma having electrons and positive ions, wherein the electric field pushes the electrons such that the electrons obtain a velocity having a velocity component due to the electric field, wherein the electric field pushes the positive ions such that the positive ions obtain an ion velocity having an ion velocity component due to the electric field, and wherein the positive ions are pushed by the magnetic field in a direction of flow.

5. The plasma actuator according to claim 4, wherein the surface is a curved surface, wherein when the electric field pushes the electrons the electrons move closer to the curved surface such that charge separation is increased, wherein the electrons are pushed by the magnetic field in a direction of flow, wherein the increased charge separation increases a space charge created electric field component, wherein an increased force applied to the positive ions by the space charge created electric field component enhances an ion velocity component due to the electric field, and wherein the enhancement in the ion velocity component due to the electric field increases a force applied to the positive ions by the magnetic field that increases thrust applied to:

the ionizable gas;

the ionizable gas mixture; or the ionizable gas and the ionizable gas mixture, respectively.

6. A plasma actuator, comprising:

a surface;

a pair of electrodes;

a voltage source configured to apply a voltage across the pair of electrodes; and at least one aperture in the surface, wherein the pair of electrodes are positioned with respect to the surface, such that when the voltage source applies the voltage across the pair of electrodes, when: an ionizable gas;

an ionizable gas mixture; or an ionizable gas and an ionizable gas mixture, near or at atmospheric pressure is located in a region above the surface, an electric field is created in the region above the surface that creates a plasma and an electrohydrodynamic force that pushes:

the ionizable gas;

the ionizable gas mixture; or the ionizable gas and the ionizable gas mixture, respectively, to create a flow of:

the ionizable gas;

the ionizable gas mixture; or the ionizable gas and the ionizable gas mixture, respectively, and wherein the at least one aperture is positioned with respect to the surface such that the flow creates a pressure that pulls:

a second gas;

a second gas mixture; or a second gas and a second gas mixture, out of the at least one aperture and entrains:

the second gas;

the second gas mixture; or the second gas and the second gas mixture, respectively, such that shear between the flow and the surface is reduced.

7. The plasma actuator according to claim 6, wherein:

the second gas;

the second gas mixture; or the second gas and the second gas mixture, respectively, is the same as:

the ionizable gas;

the ionizable gas mixture; or the ionizable gas and the ionizable gas mixture, respectively.

8. The plasma actuator according to claim 6, wherein:

the second gas;
the second gas mixture; or
the second gas and the second gas mixture, respectively, is pumped out through the at least one aperture and is entrained in the flow.

9. A plasma actuator, comprising:
a first surface and a second surface,
wherein a region is located between the first surface and the second surface;
a first at least one electrode;
a second at least one electrode,
wherein the second at least one electrode is separated from the first surface, separated from the second surface, and positioned in the region; and
a voltage source configured to apply a voltage across the first at least one electrode and the second at least one electrode,
wherein the first at least one electrode and the second at least one electrode are positioned with respect to the first surface and the second surface, such that when the voltage source applies the voltage across the first at least one electrode and the second at least one electrode, when:
an ionizable gas;
an ionizable gas mixture; or
an ionizable gas and an ionizable gas mixture near or at atmospheric pressure is located in the region, an electric field is created in the region that creates a plasma and an electrohydrodynamic force that pushes:
the ionized gas;
the ionizable gas mixture; or
the ionized gas and the ionizable gas mixture, respectively, to create a flow of:
the ionizable gas;
the ionizable gas mixture;
the ionizable gas and the ionizable gas mixture, respectively.

10. A method of creating a thrust, comprising:
providing a plasma actuator,
wherein the plasma actuator comprises:
  a curved surface;
  a pair of electrodes;
  a voltage source configured to apply a voltage across the pair of electrodes; and
  at least one magnet,
  wherein the at least one magnet is positioned with respect to the curved surface such that a magnetic field is created in a region above the curved surface,
  wherein the pair of electrodes are positioned with respect to the curved surface, such that when the voltage source applies the voltage across the pair of electrodes, when
    an ionizable gas;
    an ionizable gas mixture; or
    an ionizable gas and an ionizable gas mixture, near or at atmospheric pressure is located in the region above the curved surface, an electric field is created in the region above the curved surface that creates a plasma having electrons and positive ions,
  wherein the electric field pushes the electrons such that the electrons obtain a velocity having a velocity component due to the electric field,
  wherein the electrons are pushed by the magnetic field such that the electrons are moved closer to the curved surface such that charge separation is increased,
  wherein the increased charge separation increases a space charge created electric field component, and
  wherein an increased force applied to the positive ions by the space charge created electric field component enhances a thrust applied to:
    the ionizable gas;
    the ionizable gas mixture; or
    the ionizable gas and the ionizable gas mixture, respectively; and
applying the voltage across the pair of electrodes when
  the ionizable gas;
  the ionizable gas mixture; or
  the ionizable gas and the ionizable gas mixture, near or at atmospheric pressure is located in the region above the curved surface.

11. A method of creating a thrust, comprising:
providing a plasma actuator,
wherein the plasma actuator comprises:
  a surface;
  a pair of electrodes;
  a voltage source configured to apply a voltage across the pair of electrodes; and
  at least one magnet,
  wherein the at least one magnet is positioned with respect to the surface such that a magnetic field is created in a region above the surface,
  wherein the pair of electrodes are positioned with respect to the surface, such that when the voltage source applies the voltage across the pair of electrodes, when:
    an ionizable gas;
    an ionizable gas mixture; or
    an ionizable gas and an ionizable gas mixture, near or at atmospheric pressure is located in the region above the surface, an electric field is created in the region above the surface that creates a plasma having electrons and positive ions,
  wherein the electric field pushes the electrons such that the electrons obtain a velocity having a velocity component due to the electric field,
  wherein the electric field pushes the positive ions such that the positive ions obtain an ion velocity having an ion velocity component due to the electric field, and
  wherein the positive ions are pushed by the magnetic field in a direction of flow; and
applying the voltage across the pair of electrodes when
  the ionizable gas;
  the ionizable gas mixture; or
  the ionizable gas and the ionizable gas mixture, near or at atmospheric pressure is located in the region above the surface.

12. The method according to claim 11,
wherein the surface is a curved surface,
wherein when the electric field pushes the electrons the electrons move closer to the curved surface such that charge separation is increased,
wherein the electrons are pushed by the magnetic field in a direction of flow,
wherein the increased charge separation increases a space charge created electric field component, wherein an increased force applied to the positive ions by the space charge created electric field component enhances an ion velocity component due to the electric field,
wherein the enhancement in the ion velocity component due to the electric field increases a force applied to the positive ions by the magnetic field that increases thrust applied to:
the ionizable gas;
the ionizable gas mixture; or
the ionizable gas and the ionizable gas mixture, respectively, and
wherein applying the voltage across the pair of electrodes when
the ionizable gas;
the ionizable gas mixture; or
the ionizable gas and the ionizable gas mixture, near or at atmospheric pressure is located in the region above the surface comprises:
applying the voltage across the pair of electrodes when
the ionizable gas;
the ionizable gas mixture; or
the ionizable gas and the ionizable gas mixture, near or at atmospheric pressure is located in the region above the curved surface.

13. A method of reducing shear between a flow and a surface, comprising:
providing a plasma actuator,
wherein the plasma actuator comprises:
a surface;
a pair of electrodes;
a voltage source configured to apply a voltage across the pair of electrodes; and
at least one aperture in the surface,
wherein the pair of electrodes are positioned with respect to the surface, such that when the voltage source applies the voltage across the pair of electrodes, when:
an ionizable gas;
an ionizable gas mixture; or
an ionizable gas and an ionizable gas mixture, near or at atmospheric pressure is located in a region above the surface, an electric field is created in the region above the surface that creates a plasma and an electrohydrodynamic force that pushes:
the ionizable gas;
the ionizable gas mixture; or
the ionizable gas and the ionizable gas mixture, respectively, to create a flow of:
the ionizable gas;
the ionizable gas mixture; or
the ionizable gas and the ionizable gas mixture, respectively, and
wherein the at least one aperture is positioned with respect to the surface such that the flow creates a pressure that pulls:
a second gas;
a second gas mixture; or
a second gas and a second gas mixture, out of the at least one aperture and entrains:
the second gas;
the second gas mixture; or
the second gas and the second gas mixture, respectively, such that shear between the flow and the surface is reduced; and
applying the voltage across the pair of electrodes when
the ionizable gas;
the ionizable gas mixture; or
the ionizable gas and the ionizable gas mixture, near or at atmospheric pressure is located in the region above the curved surface.

14. A method of creating a flow, comprising:
providing a plasma actuator,
wherein the plasma actuator comprises:
a first surface and a second surface,
wherein a region is located between the first surface and the second surface;
a first at least one electrode;
a second at least one electrode,
wherein the second at least one electrode is separated from the first surface, separated from the second surface, and positioned in the region; and
a voltage source configured to apply a voltage across the first at least one electrode and the second at least one electrode,
wherein the first at least one electrode and the second at least one electrode are positioned with respect to the first surface and the second surface, such that when the voltage source applies the voltage across the first at least one electrode and the second at least one electrode, when:
an ionizable gas;
an ionizable gas mixture; or
an ionizable gas and an ionizable gas mixture near or at atmospheric pressure is located in the region, an electric field is created in the region that creates a plasma and an electrohydrodynamic force that pushes:
the ionized gas;
the ionizable gas mixture; or
the ionized gas and the ionizable gas mixture, respectively, to create a flow of:
the ionizable gas;
the ionizable gas mixture;
the ionizable gas and the ionizable gas mixture, respectively; and
applying the voltage across the first at least one electrode and the second at least one electrode when
the ionizable gas;
the ionizable gas mixture; or
the ionizable gas and the ionizable gas mixture, near or at atmospheric pressure is located in the region.

15. The plasma actuator according to claim 1,
wherein the curved surface is an inner surface of a hollow cylinder,
wherein a first electrode and a second electrode of the pair of electrodes are offset from each other in a longitudinal direction of the hollow cylinder, and
wherein the thrust applied to
the ionizable gas;
the ionizable gas mixture; or
the ionizable gas and the ionizable gas mixture has a component in the longitudinal direction of the hollow cylinder.

16. The plasma actuator according to claim 1,
wherein the pair of electrodes have a spiral pattern at an angle greater than 0° and less than 90° with respect to the longitudinal direction of the hollow cylinder.

17. The plasma actuator according to claim 9,
wherein the second at least one electrode comprises two or more electrodes.

18. The plasma actuator according to claim 9,
wherein the first surface and the second channel are on an inner surface of a channel, and wherein the flow has a direction of flow in a longitudinal direction of the channel.

19. The plasma actuator according to claim 18,
wherein the first surface is an inner surface of a first wall of the channel,
wherein the second surface is an inner surface of a second wall of the channel,
wherein the first at least one electrode comprises a first wall electrode in contact with the first wall and a second wall electrode in contact with the second wall, and
wherein the second at least one electrode comprises two or more electrodes.

20. The plasma actuator according to claim 19,
wherein the first wall electrode and a second wall electrode are offset from the second at least one electrode in the longitudinal direction of the channel.

21. The method according to claim 10,
wherein the at least one magnet comprises a permanent magnet.

22. The method according to claim 10,
wherein the at least one magnet comprises an electromagnet.

23. The method according to claim 13,
wherein:
the second gas;
the second gas mixture; or
the second gas and the second gas mixture, respectively, is the same as:
the ionizable gas;
the ionizable gas mixture; or
the ionizable gas and the ionizable gas mixture, respectively.

24. The method according to claim 13,
wherein:
the second gas;
the second gas mixture; or
the second gas and the second gas mixture, respectively, is pumped out through the at least one aperture and is entrained in the flow.

25. The method according to claim 10,
wherein the curved surface is an inner surface of a hollow cylinder,
wherein a first electrode and a second electrode of the pair of electrodes are offset from each other in a longitudinal direction of the hollow cylinder, and
wherein the thrust applied to
the ionizable gas;
the ionizable gas mixture; or
the ionizable gas and the ionizable gas mixture has a component in the longitudinal direction of the hollow cylinder.

26. The method according to claim 10,
wherein the pair of electrodes have a spiral pattern at an angle greater than 0° and less than 90° with respect to the longitudinal direction of the hollow cylinder.

27. The method according to claim 14,
wherein the second at least one electrode comprises two or more electrodes.

28. The method according to claim 14,
wherein the first surface and the second channel are on an inner surface of a channel, and
wherein the flow has a direction of flow in a longitudinal direction of the channel.

29. The method according to claim 28,
wherein the first surface is an inner surface of a first wall of the channel,
wherein the second surface is an inner surface of a second wall of the channel,
wherein the first at least one electrode comprises a first wall electrode in contact with the first wall and a second wall electrode in contact with the second wall, and
wherein the second at least one electrode comprises two or more electrodes.

30. The method according to claim 29,
wherein the first wall electrode and a second wall electrode are offset from the second at least one electrode in the longitudinal direction of the channel.

* * * * *